United States Patent
Bento

(10) Patent No.: US 6,834,661 B2
(45) Date of Patent: Dec. 28, 2004

(54) DUAL MODE SOLENOID VALVE WITH PRESSURE REGULATION

(75) Inventor: José Carlos Bento, São Paulo (BR)

(73) Assignee: Ross Operating Valve Company, Troy, MI (US)

( * ) Notice: Subject to any disclaimer, the term of this patent is extended or adjusted under 35 U.S.C. 154(b) by 0 days.

(21) Appl. No.: 10/623,387

(22) Filed: Jul. 18, 2003

(65) Prior Publication Data

US 2004/0089354 A1 May 13, 2004

Related U.S. Application Data

(63) Continuation-in-part of application No. 10/329,300, filed on Dec. 23, 2002, now Pat. No. 6,755,214, which is a continuation-in-part of application No. 10/209,655, filed on Jul. 31, 2002, now Pat. No. 6,732,761.
(60) Provisional application No. 60/309,843, filed on Aug. 3, 2001.

(51) Int. Cl.[7] ............................................... F15B 13/043
(52) U.S. Cl. .................... 137/12; 137/269; 137/270; 137/625.64
(58) Field of Search .................... 137/12, 269, 270, 137/625.64

(56) References Cited

U.S. PATENT DOCUMENTS

| 3,903,787 A | 9/1975 | Kroth et al. |
| 4,067,357 A | 1/1978 | Ruchser |

FOREIGN PATENT DOCUMENTS

| CH | 364152 | 10/1962 |
| GB | 2255840 | 11/1992 |

*Primary Examiner*—Gerald A. Michalsky
(74) *Attorney, Agent, or Firm*—Mark Mollon

(57) ABSTRACT

A control valve system includes a housing having an inlet port, a first output port, a second output port, and a valve chamber. A primary spool and a secondary spool are independently slidable in the valve chamber. The secondary spool has a first end for abutting against the primary spool and has a second end with a working surface area greater than the working surface areas at the ends of the primary spool. A solenoid valve assembly controllably connects the inlet port to the second end of the secondary spool. A biaser provides a biasing force to the primary spool. A first fluid passage through the primary spool provides fluid communication between the first output port and a second end of the primary spool for displacing the primary spool relative to the secondary spool in an energy saving mode, thereby regulating a pressure at the first output relative to the predetermined magnitude of the biasing force.

12 Claims, 16 Drawing Sheets

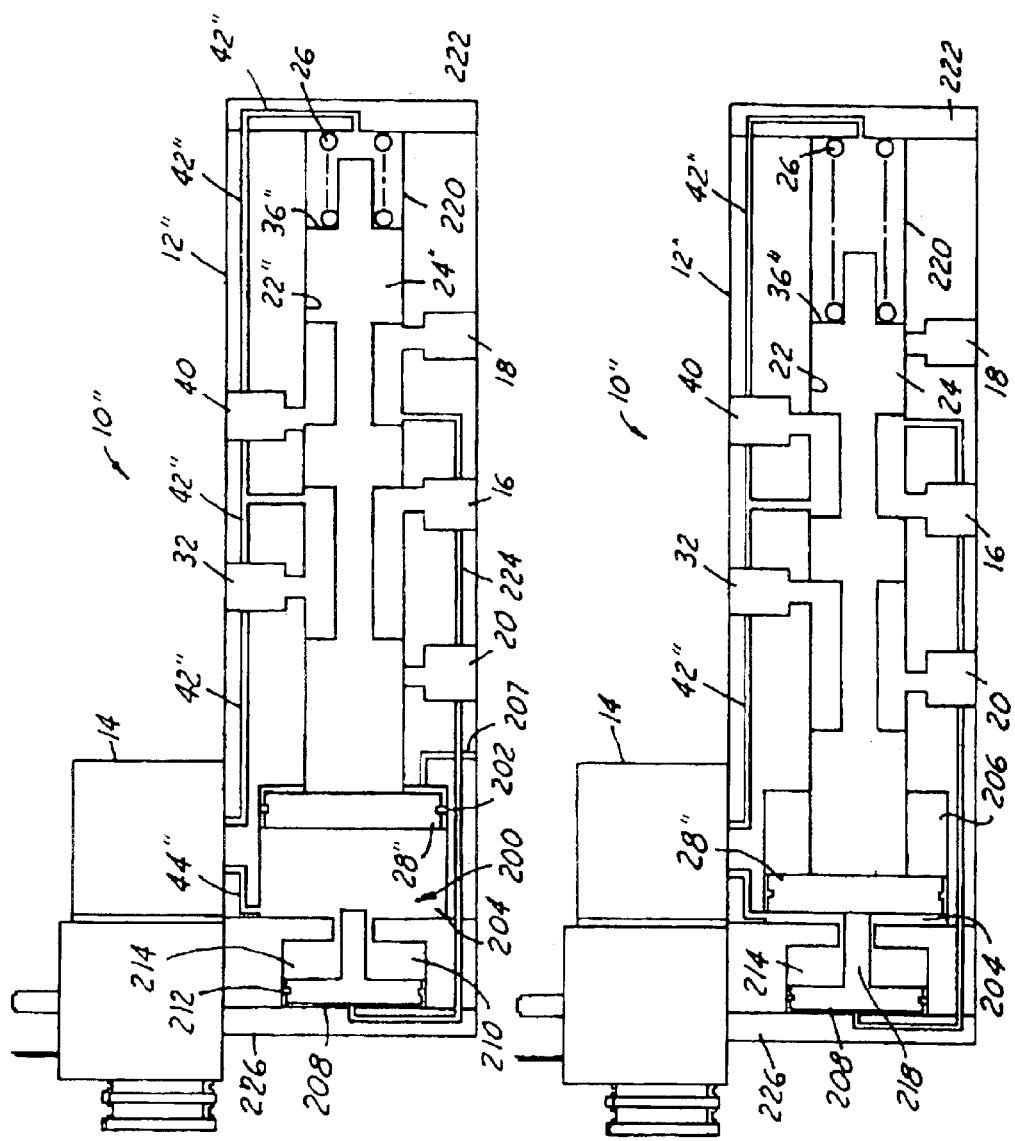

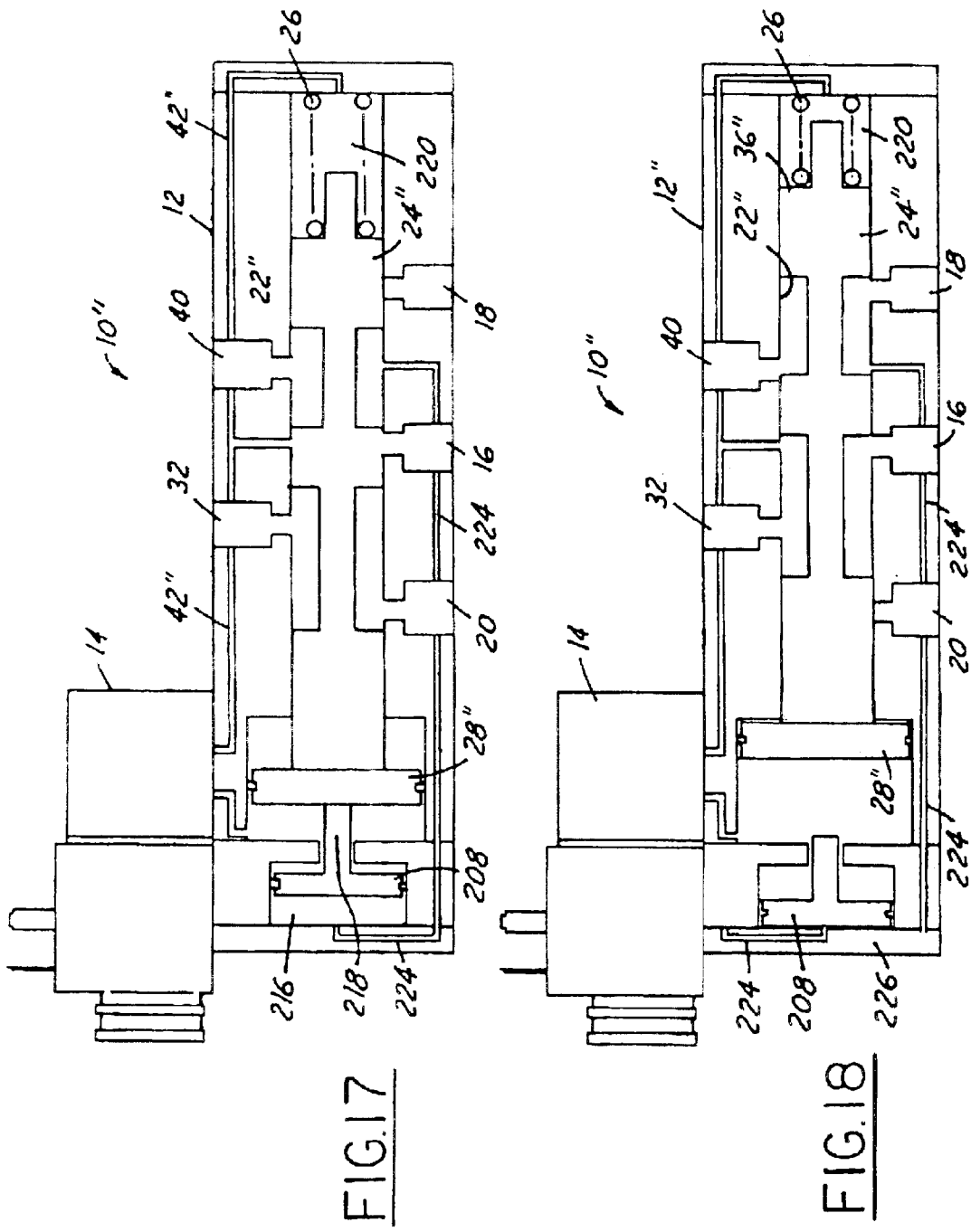

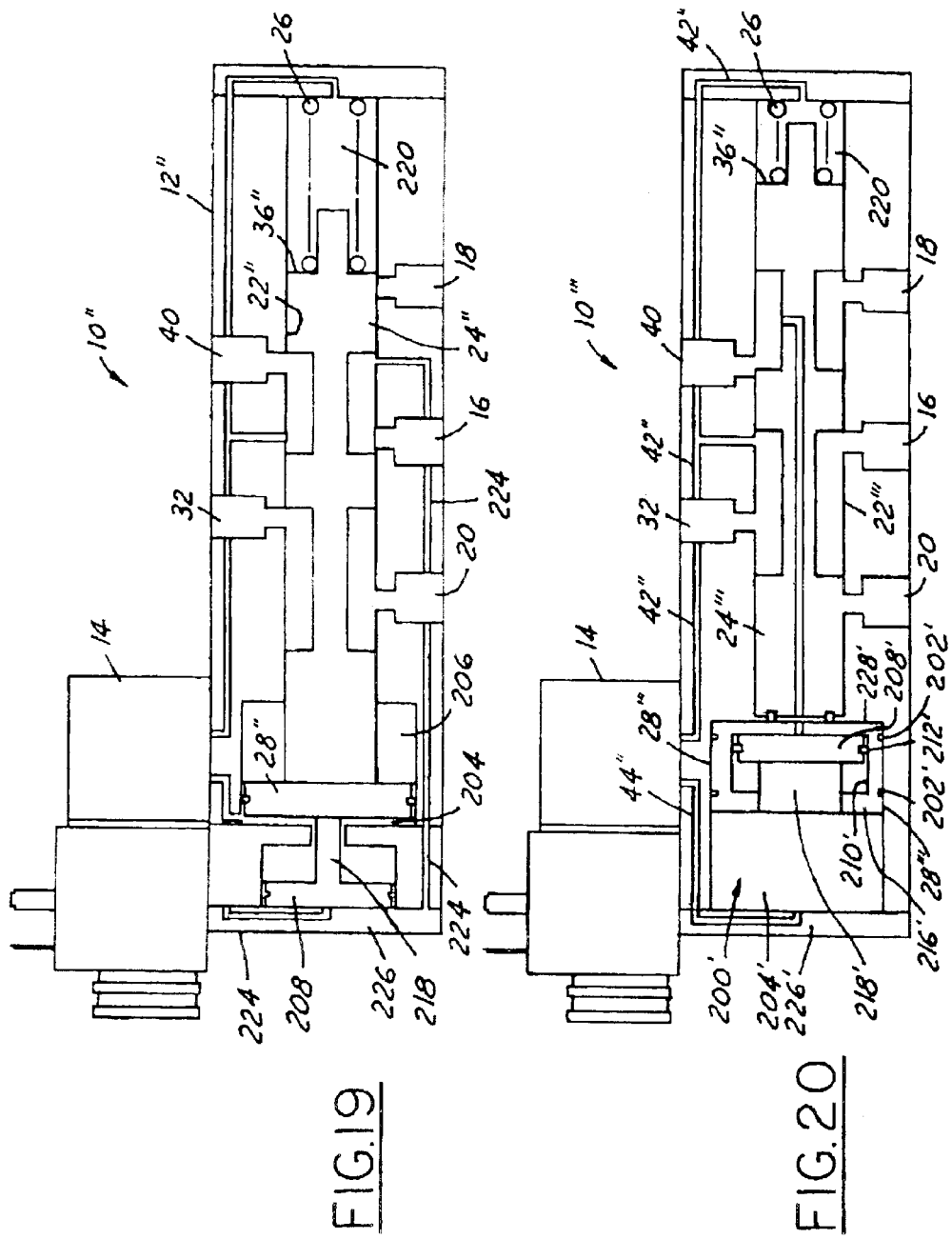

DUAL MODE SOLENOID VALVE WITH PRESSURE REGULATION

CROSS-REFERENCE TO RELATED APPLICATIONS

This application is a continuation-in-part of U.S. patent application Ser. No. 10/329,300 filed on Dec. 23, 2002, now U.S. Pat. No. 6,755,214, which is a continuation-in-part of U.S. patent application Ser. No. 10/209,655 filed on Jul. 31, 2002, now U.S. Pat. No. 6,732,761, which claims the benefit of U.S. Provisional Application No. 60/309,843, filed Aug. 3, 2001. The disclosures of the above applications are incorporated herein by reference for all purposes.

FIELD OF THE INVENTION

The present invention generally relates to control valves and, more particularly, relates to a dual mode control valve wherein one mode is capable of reducing the energy consumption thereof by regulating a pressure at an output port.

BACKGROUND OF THE INVENTION

As is well known in the art, control valves have frequently been used to control and supply a working fluid, such as air, to a working device. Typically, these control valves employ a moveable valve spool disposed in a valve housing. The valve housing includes a plurality of fluid passages that are selectively interconnected in response to movement of the valve spool so as to control the flow of the fluid and, thus, the output of the control valve.

Conventional control valves often employ a solenoid valve mounted thereto for actuating the valve spool. The solenoid valve is controlled via an electrical input signal between a first position, where the solenoid valve is de-energized so as to close a fluid passage between an input pilot pressure and an output controlling pressure and to open the outlet to atmosphere, and a second position, where the solenoid is energized via the electrical input so as to open a passageway between the input pilot pressure and the output controlling pressure and block the fluid passage from outlet to exhaust.

It should be readily appreciated to one skilled in the art that in order to apply a constant controlling pressure, the electrical control signal must continue to energize the solenoid valve. That is, in order for a conventional control valve to maintain the spool in a predetermined position, it is necessary to maintain a constant control pressure upon one side of the spool. Therefore, in order to maintain this constant control pressure on the spool, it is necessary to maintain the solenoid valve in an opened and, thus, energized state. Moreover, it is necessary to employ full line fluid pressure to displace and maintain the working device in a predetermined position. Therefore, it will be understood that operating a device at full line pressure requires more energy to drive compressors than operating the device at a reduced line pressure.

Accordingly, there exists a need in the relevant art to provide a control valve capable of producing an output of working fluid to be used with a conventional working device that is capable of minimizing the energy consumed during actuation. Furthermore, there exists a need in the relevant art to provide a control valve that maintains the position of a control element at a pressure less than full line pressure. In certain valve applications, however, it may still be desirable to operate a valve in the standard mode wherein full line pressure is consumed at all times. Thus, there exists a need in the relevant art to provide valves capable of either an energy saver mode or a standard mode while minimizing manufacturing and inventory stocking costs associated with multiple valve types.

SUMMARY OF THE INVENTION

A control valve system having an advantageous construction is provided. The control valve system includes a housing having an inlet port, a first output port, a second output port, and a valve chamber. A primary spool has first and second longitudinal ends with respective working surface areas being substantially equal, wherein the primary spool is slidable in the valve chamber to a first position where fluid communication is established between the inlet port and the first output port, a second position where fluid communication is established between the inlet port and the second output port, and an intermediate third position where fluid communication is generally prevented between the inlet port and both of the first and second output ports. A secondary spool is independently slidable in the valve chamber and has a first end for abutting against the second end of the primary spool and has a second end with a working surface area greater than the other working surface areas. A solenoid valve assembly is positionable in a first position for providing fluid communication from the inlet port to the second end of the secondary spool to move the primary spool from the first position to the second position, and in a second position to isolate the inlet port from the second end of the secondary spool. A biaser provides a biasing force to the primary spool in a direction toward the first position which has a predetermined magnitude when the primary spool is in the third position. A first fluid passage through the primary spool provides fluid communication between the first output port and the second end of the primary spool for displacing the primary spool relative to the secondary spool in an energy saving mode when the solenoid valve is in the second position, thereby regulating a pressure at the first output relative to the predetermined magnitude of the biasing force.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 15 is a cross-sectional view of a control valve system according to a fourth embodiment of the present invention illustrated in a normal operation mode where the solenoid valve assembly is energized;

FIG. 16 is a cross-sectional view illustrating the control valve system of FIG. 15 wherein the solenoid valve assembly is de-energized;

FIG. 17 is a cross-sectional view illustrating the control valve system of FIG. 15 being maintained in a predetermined position while the solenoid valve assembly remains de-energized and the valve spool is in an equilibrium position;

FIG. 18 is a cross-sectional view of the control valve system of FIG. 15, having an end cap reversed, in a normal operation mode where the solenoid valve assembly is energized;

FIG. 19 is a cross-sectional view of the control valve system of FIG. 15, having the end cap reversed, where the solenoid valve assembly is de-energized;

FIG. 20 is a cross-sectional view of a variation of the control valve system of FIG. 15 illustrated in a normal operation mode where the solenoid valve assembly is energized;

DETAILED DESCRIPTION OF THE PREFERRED EMBODIMENTS

Figure 1:
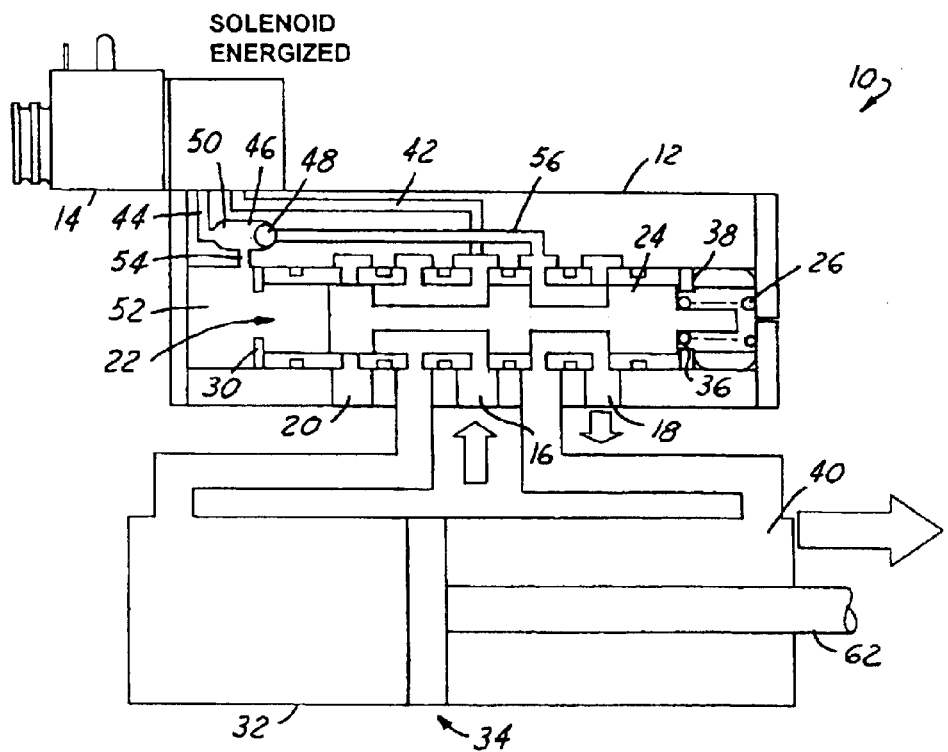
FIG. 1 is a cross-sectional view of a control valve system according to a first embodiment of the present invention illustrated in a normal operation mode where the solenoid valve assembly is energized.

The following description of the preferred embodiments is merely exemplary in nature and is in no way intended to limit the invention, its application, or uses. For example, the principles of the present invention are equally applicable to a wide variety of valve systems, such as spool valves, poppet valves (i.e. resilient, metal, ceramic, and the like), trapping presses, and feedback controls.

Referring now to FIGS. 1–4 in which like reference numerals designate like or corresponding parts throughout the several views, there is illustrated a control valve system, which is designated generally by the reference numeral 10. Control valve system 10 is shown as a fluid control valve in FIGS. 1–3 and as a fluid circuit in FIG. 4.

Figure 2:
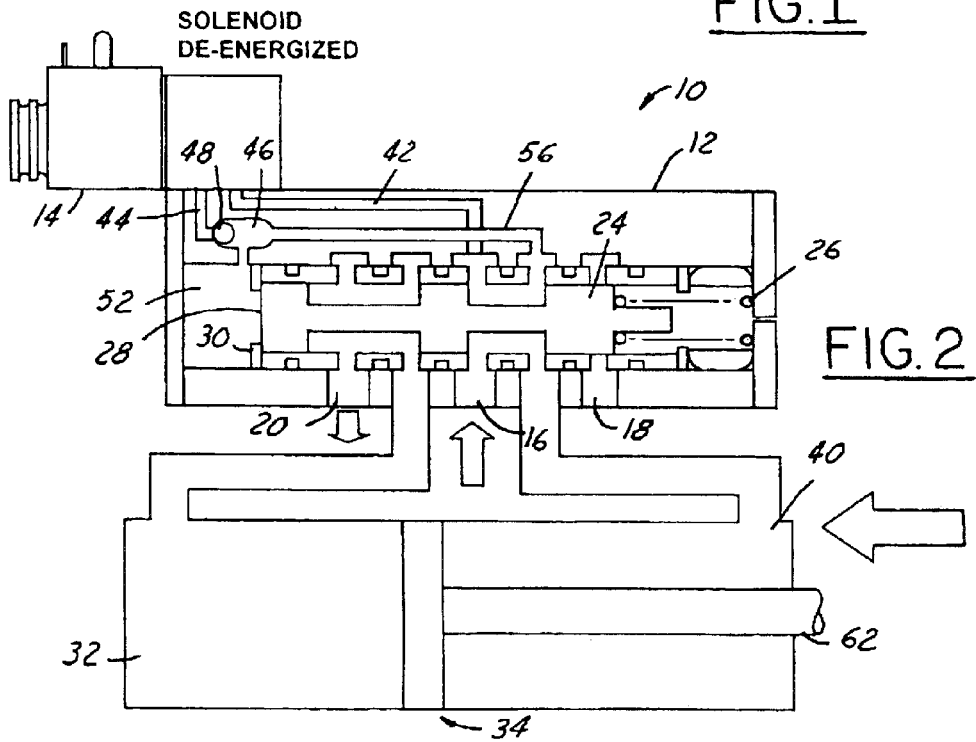
FIG. 2 is a cross-sectional view illustrating the control valve system of FIG. 1 wherein the solenoid valve assembly is de-energized.
Figure 3:
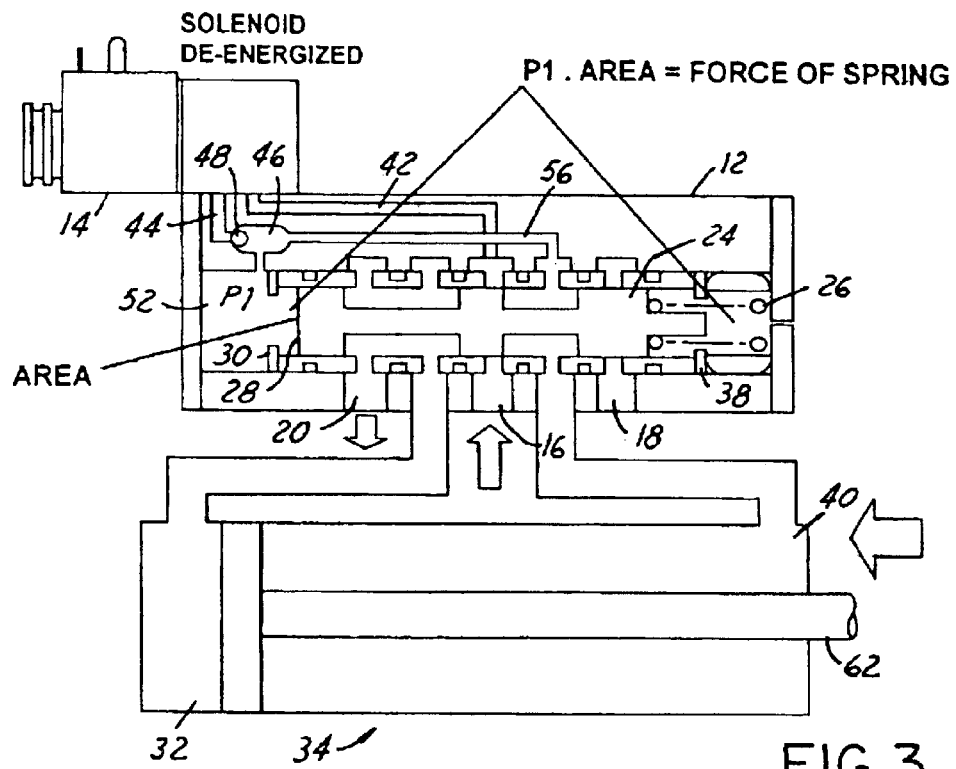
FIG. 3 is a cross-sectional view illustrating the control valve system of FIG. 1 being maintained in a predetermined position while the solenoid valve assembly remains de-energized and the valve spool is in an equilibrium position.

Referring in particular to FIGS. 1–3, control valve system 10 comprises a main valve assembly 12 and a solenoid valve assembly 14. Main valve assembly 12 is positioned adjacent to and operably coupled to solenoid valve assembly 14. Main valve assembly 12 includes a fluid inlet passage 16, a first exhaust passage 18, a second exhaust passage 20, and a valve bore 22. Disposed within valve bore 22 is a valve member or spool 24. Spool 24 is normally biased via a spring 26 into a seated position where a face portion 28 of spool 24 contacts a first stop 30 disposed in valve bore 22 to exhaust fluid from a backside chamber 32 of a piston member assembly 34 out second exhaust passage 20. As will be described below, spool 24 is further positionable in an unseated position where face portion 28 of spool 24 is spaced apart from first stop 30 of valve bore 22, yet a shoulder portion 36 disposed on an opposing side of spool 24 contacts a second stop 38 disposed in valve bore 22 to exhaust fluid from a front side chamber 40 of piston member assembly 34 through first exhaust passage 18.

It should be appreciated that spring 26 may be eliminated. In this case, spool 24 would be actuated in response to differential fluid pressure exerted upon opposing faces of spool 24. It is also anticipated that these faces could include differently sized surfaces areas (i.e. different area ratios), which would enable control valve system 10 to be easily modified to produce a wide range of different output pressures.

Control valve system 10 further includes a plurality of fluid passages interconnecting fluid inlet passage 16, first exhaust passage 18, and second exhaust passage 20. A fluid passage 42 extends between fluid inlet passage 16 and an inlet to solenoid valve assembly 14. Fluid passage 42 serves as a pilot passage to supply a pilot pressure to solenoid valve assembly 14. A fluid passage 44 extends between an outlet of solenoid valve assembly 14 and a shuttle valve 46.

Shuttle valve 46 generally includes a shuttle ball 48 moveably disposed in a shuttle chamber 50. As will be described below, shuttle valve 46 moves in response to fluid pressure to fluidly block opposing ends of shuttle valve 46 against fluid flow. Shuttle valve 46 is fluidly coupled to a valve chamber 52 via a fluid passage 54. Valve chamber 52 is adjacent face portion 28 of spool 24 and disposed within valve bore 22 such that fluid pressure within valve chamber 52 acts upon face portion 28 to move spool 24 against the biasing force of spring 26.

Figure 12:
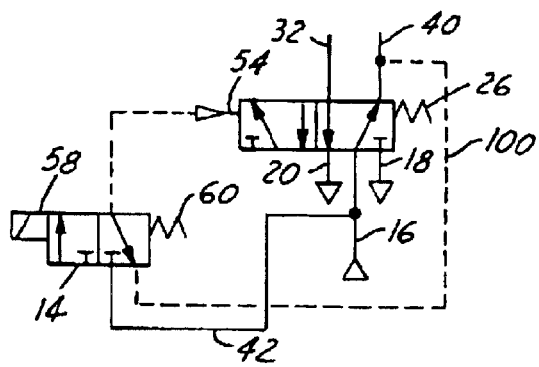
FIG. 12 is a circuit diagram of a control valve system according to a third embodiment of the present invention illustrated in an initial position where the solenoid valve assembly is de-energized and the piston is stationary.
Figure 13:
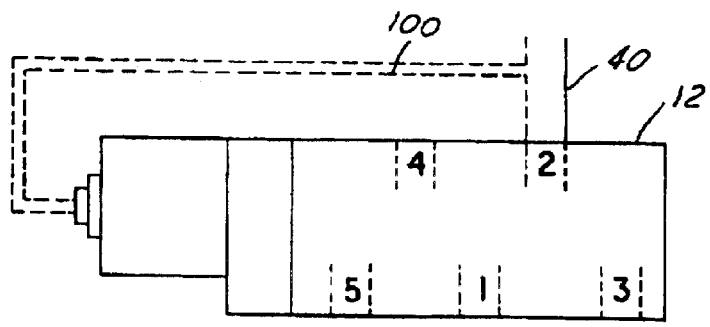
FIG. 13 is a schematic diagram illustrating the feedback passage being disposed externally from the housing.
Figure 14:
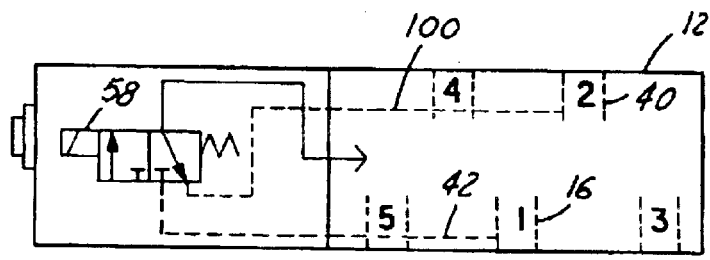
FIG. 14 is a schematic diagram illustrating the feedback passage being disposed internally in the housing.

However, as seen in FIGS. 12–14, shuttle ball 48 may be eliminated to provide a more simplified design. Specifically, a fluid passage 100 extends between front side chamber 40 and solenoid 58. Fluid passage 100 permits the flow or exhaust of pilot fluid from valve chamber 52 to front side chamber 40 when solenoid 58 is in the position shown in FIG. 12. However, it should be appreciated that fluid passage 100 may extend either externally (see FIG. 13) or internally (FIG. 14) of main valve assembly 12.

Control valve system 10 further includes a feedback passage 56 extending between shuttle valve 46 and first exhaust passage 18. Accordingly, shuttle ball 48 of shuttle valve 46 is moveable within shuttle chamber 50 into a first position, where shuttle ball 48 prevents fluid flow through feedback passage 56, and a second position, where shuttle ball 48 prevents back flow of fluid through fluid passage 44.

Figure 4:
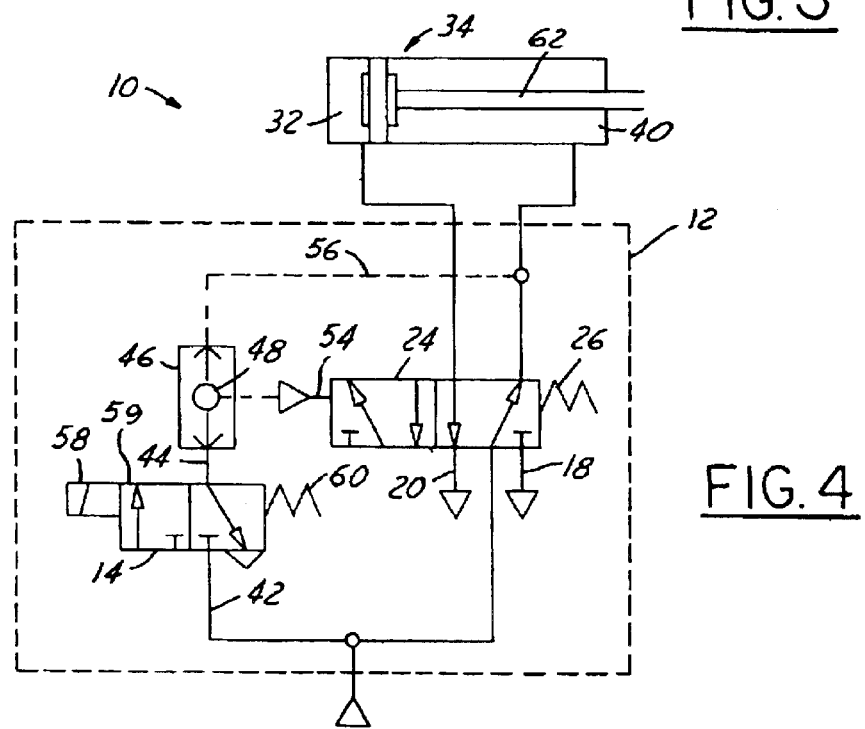
FIG. 4 is a circuit diagram illustrating the control valve system according to the first embodiment of the present invention.

FIG. 1 illustrates control valve system 10 in a normal operation mode in which pressurized fluid from fluid inlet passage 16 is directed into backside chamber 32 of piston member assembly 34 to drive a piston 62 outward (to the right in the figures). Specifically, pressurized fluid from fluid inlet passage 16 is provided in fluid passage 42. Referring to FIG. 4, energizing solenoid valve assembly 14 will establish a fluid communication between fluid passage 42 and fluid passage 44. That is, a solenoid 58 of solenoid valve assembly 14 is energized such that a solenoid spool 59 is moved to the right in FIG. 4 against the biasing force of a solenoid spring 60. Pressurized fluid is then introduced from fluid passage 44 into shuttle valve 46, thereby moving shuttle ball 48 against feedback passage 56. Pressurized fluid within shuttle valve 46 is then directed into valve chamber 52. The fluid pressure within valve chamber 52 acts upon face portion 28 of spool 24. Once the fluid pressure within valve chamber 52 is greater than the biasing force of spring 26, spool 24 moves to the right until shoulder portion 36 of spool 24 is seated upon second stop 38. This movement of spool 24 enables fluid to flow from fluid inlet passage 16 into backside chamber 32 of piston member assembly 34, thereby extending piston 62 outward (to the right in FIGS. 1–4). Accordingly, when control valve system 10 is in the position illustrated in FIG. 1, fluid inlet passage 16, backside chamber 32 of piston member assembly 34, fluid passage 42, shuttle valve 46, and valve chamber 52 are all at the same fluid pressure, namely equal to the fluid pressure of fluid inlet passage 16.

Referring now to FIG. 2, solenoid valve assembly 14 is de-energized and therefore pilot fluid from fluid passage 42 is prevented from entering shuttle valve 46 and, consequently, valve chamber 52. Therefore, the biasing force of spring 26 acting on shoulder portion 36 of spool 24 biases spool 24 leftward until face portion 28 generally contacts first stop 30. This leftward movement of spool 24 enables fluid communication between fluid inlet passage 16 and front side chamber 40 of piston member assembly 34, thereby retracting piston 62.

As can be appreciated from FIG. 2, feedback passage 56 is in fluid communication with front side chamber 40 of piston member assembly 34 and, therefore, is at the same fluid pressure. The introduction of pressurized fluid from fluid inlet passage 16 into front side chamber 40 and feedback passage 56 forces shuttle ball 48 of shuttle valve 46 leftward, since the fluid pressure of fluid inlet passage 16 is now greater than the fluid pressure within valve chamber 52. This leftward movement of shuttle ball 48 and shuttle valve 46 then permits fluid flow from front side chamber 40 of piston member assembly 34 into valve chamber 52, thereby increasing the fluid pressure within valve chamber 52 once again. During this time, fluid is exhausted from backside chamber 32 of piston member assembly 34 through second exhaust passage 20.

As best seen in FIG. 3, fluid flow from fluid inlet passage 16 into front side chamber 40 of piston member assembly 34 and valve chamber 52 will continue until the pressure within valve chamber 52 is equal to the biasing force of spring 26. When the fluid pressure within valve chamber 52 equals the biasing force of spring 26, spool 24 reaches an intermediate equilibrium position wherein fluid flow from fluid inlet passage 16 into any of the remaining fluid passages is prevented. However, it should be appreciated by one skilled in the art that any fluid leaks or other anomalies which decrease the fluid pressure in front side chamber 40 of piston member assembly 34 will cause a simultaneous decrease in fluid pressure within valve chamber 52. This decrease in fluid pressure in valve chamber 52 enables spring 26 to move spool 24 leftward, thereby again opening fluid communication between fluid inlet passage 16 and front side chamber 40 of piston member assembly 34. As explained above, this fluid communication will continue until the fluid pressure within front side chamber 40, feedback passage 56, and valve chamber 52 is equal to the biasing force of spring 26. Therefore, it should be clear that feedback passage 56 serves to provide a method of automatically maintaining a fluid pressure in front side chamber 40 of piston member assembly 34 simply by choosing an appropriate biasing force in spring 26. The preferred fluid pressure to be maintained is directly proportional to the force of spring 26 and, therefore, spring 26 may be selected to determine the equilibrium fluid pressure.

Moreover, it should be appreciated that the pressure regulation feature of the present invention is accomplished without the need to provide full line pressure, which would otherwise consume an excessive amount of electrical energy. That is, by way of non-limiting example, traditional double action cylinders often operate such that their return to their initial position is only accomplished through the use of full-line pressure. This use of full-line pressure in the return stroke consumes an equivalent amount of compressed air as that consumed during a power stroke. This consumption of compressed air during the return stroke is believed to be unnecessary. According to the principles of the present invention, the low pressure in one outlet is sufficient for a rapid return stroke, which reduces the amount of compressed air that is consumed, thereby reducing the energy consumed by the work element. Additionally, due to the low pressure that is applied, the potential for leaks in the cylinder and/or fittings is also reduced. These advantages are obtained through the operation of the spool as a pressure regulator.

Referring now to FIGS. 5–11, in which like reference numerals designate like or corresponding parts throughout the several views and those views of the first embodiment, there is illustrated a control valve system 10' in accordance with a second embodiment of the present invention. Control valve system 10' is illustrated as a fluid control valve in FIGS. 5–10 and as a schematic fluid circuit in FIG. 11.

Figure 5:
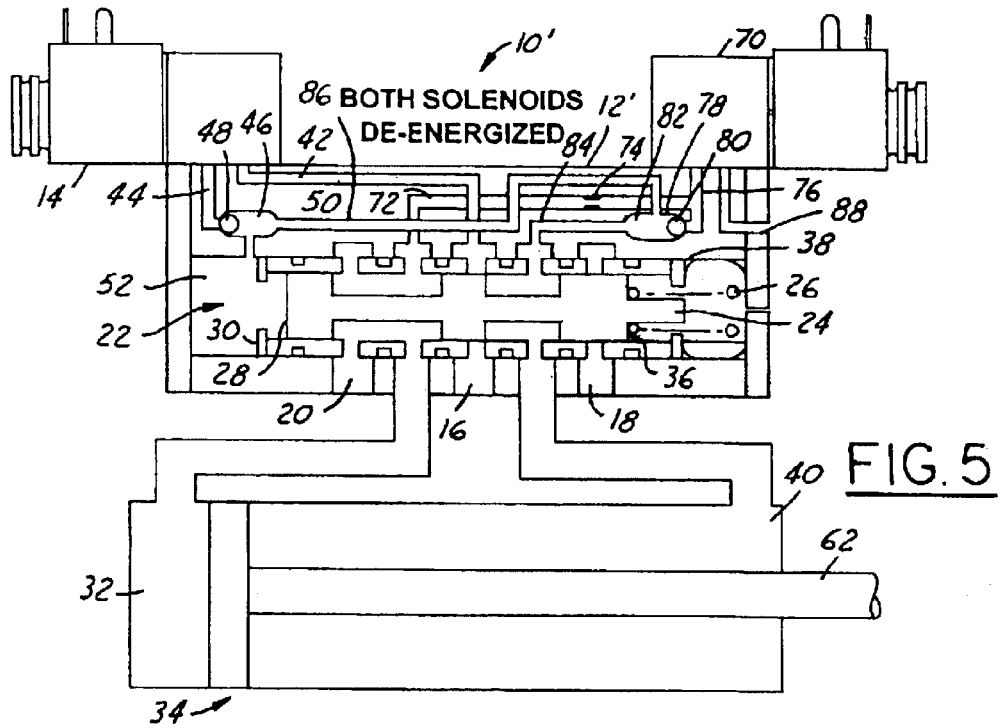
FIG. 5 is a cross-sectional view of a control valve system according to a second embodiment of the present invention illustrated in an initial position where the first and second solenoid valve assemblies are de-energized and the piston is stationary.

Referring now to FIG. 5, control valve system 10' comprises a second solenoid valve assembly 70 that is mounted to a main valve assembly 12'. Main valve assembly 12' is positioned adjacent to and operably coupled to first solenoid valve assembly 14 and second solenoid valve assembly 70. Main valve assembly 12' includes fluid inlet passage 16, first exhaust passage 18, second exhaust passage 20, and valve bore 22. Disposed within valve bore 22 is spool 24. Spool 24 is normally biased via spring 26 into a seated position where face portion 28 of spool 24 contacts first stop 30 disposed in valve bore 22 to exhaust fluid from backside chamber 32 of piston member assembly 34 out second exhaust passage 20. As described above, spool 24 is positionable in an unseated position where face portion 28 of spool 24 is spaced apart from first stop 30 of valve bore 22, yet shoulder portion 36 contacts second stop 38 disposed in valve bore 22 to exhaust fluid from front side chamber 40 of piston member assembly 34 through first exhaust passage 18.

Control valve system 10' further includes a plurality of fluid passages interconnecting fluid inlet passage 16, first exhaust passage 18, and second exhaust passage 20. Fluid passage 42 extends between fluid inlet passage 16 and the inlet to solenoid valve assembly 14. Fluid passage 42 serves as a pilot passage to supply pilot pressure to solenoid valve assembly 14. Fluid passage 44 extends between the outlet of solenoid valve assembly 14 and shuttle valve 46. Shuttle valve 46 generally includes shuttle ball 48 moveably disposed in a shuttle chamber 50. Shuttle valve 46 moves in response to fluid pressure to fluidly block opposing ends of shuttle valve 46 against fluid flow. Shuttle valve 46 is fluidly coupled to valve chamber 52 via fluid passage 54. Valve chamber 52 is adjacent face portion 28 of spool 24 and disposed within valve bore 22 such that fluid pressure within valve chamber 52 acts upon face portion 28 to move spool 24 against the biasing force of spring 26.

Control valve system 10' further includes a first feedback passage 72 extending between backside chamber 32 of piston member assembly 34 and an inlet of second solenoid valve assembly 70. A restrictor 74 is disposed within fluid passage 70 to limit the amount of fluid flow through first feedback passage 72. A fluid passage 76 extends between second solenoid valve assembly 70 and a second shuttle valve 78. Fluid passage 76 is further in fluid communication with first feedback passage 72 downstream of restrictor 74.

Second shuttle valve 78 generally includes a shuttle ball 80 moveably disposed within a shuttle chamber 82. As will be described below, second shuttle valve 78 moves in response to fluid pressure to fluidly block opposing ends of second shuttle valve 78 against fluid flow. Second shuttle valve 78 is fluidly coupled to front side chamber 40 of piston member assembly 34 via a fluid passage 84. Furthermore, a second feedback passage 86 extends between second shuttle valve 78 and first shuttle valve 46. Accordingly, shuttle ball 48 of first shuttle valve 46 is moveable within shuttle chamber 50 into a first position, where shuttle ball 48 prevents fluid flow from first shuttle valve 46 to second shuttle valve 78 and permits fluid flow into valve chamber 52, and a second position, where shuttle ball 48 prevents back flow of fluid through fluid passage 44 and permits fluid flow from second feedback passage 86 to valve chamber 52. Furthermore, shuttle ball 80 of second shuttle valve 78 is moveable within shuttle chamber 82 into a first position, where shuttle ball 80 prevents fluid flow from fluid passage 76 to fluid passage 84, and a second position, where shuttle ball 80 prevents back flow of fluid from second feedback passage 86 to fluid passage 76. It should be noted, however, that shuttle ball 80 of second shuttle valve 78 can not block second feedback passage 86, hence second feedback passage 86 is always in fluid communication with either fluid passage 76 or fluid passage 84.

Figure 6:
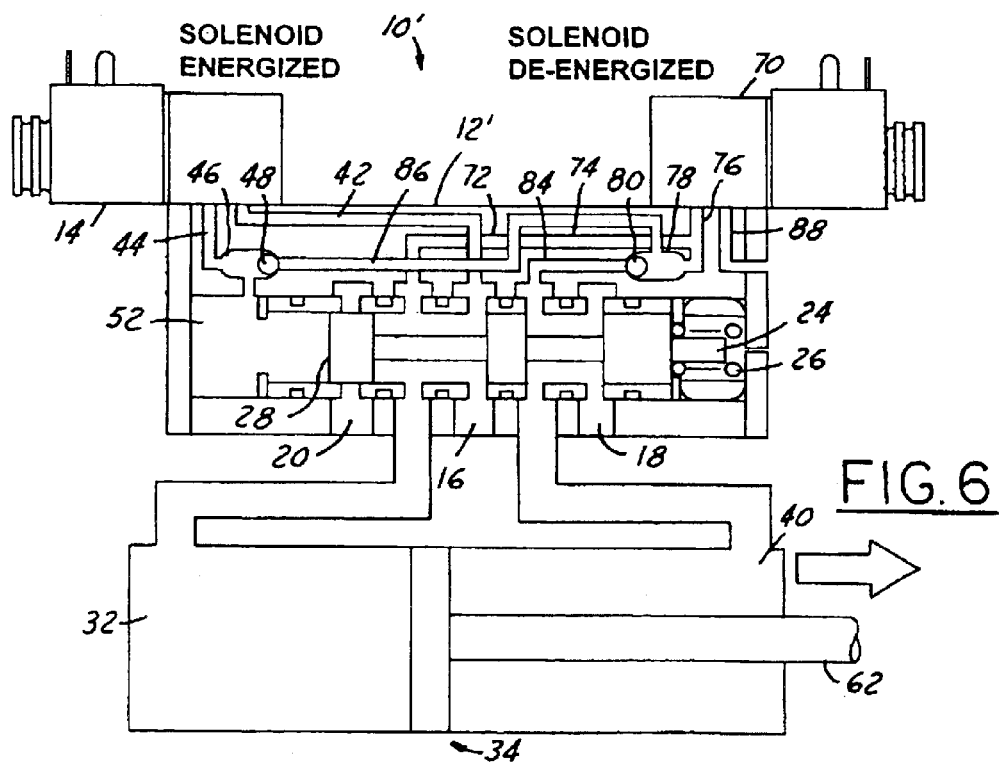
FIG. 6 is a cross-sectional view illustrating the control valve system of FIG. 5 wherein the first solenoid valve assembly is energized and the second solenoid valve assembly is de-energized.

FIG. 5 illustrates control valve system 10' in its initial equilibrium position. As illustrated in FIG. 6, first solenoid valve assembly 14 is then energized.

FIG. 6 illustrates control valve system 10' in a normal operation mode in which pressurized fluid from fluid inlet passage 16 is directed into backside chamber 32 of piston member assembly 34 to drive piston 62 outward (to the right in the FIGS.). Specifically, pressurized fluid from fluid inlet passage 16 is provided in fluid passage 42. First solenoid valve assembly 14 is energized such that fluid communication is established between fluid passage 42 and fluid passage 44. Pressurized fluid is then introduced from fluid passage 44 into first shuttle valve 46, thereby moving shuttle ball 48 against second feedback passage 86. Pressurized fluid within first shuttle valve 46 is then directed into valve chamber 52. The fluid pressure within valve chamber 52 acts upon face portion 28 of spool 24. Once the fluid pressure within valve chamber 52 is greater than the biasing force of spring 26, spool 24 moves to the right until shoulder portion 36 of spool 24 is seated upon second stop 38. This movement of spool 24 enables fluid to flow from fluid inlet passage 16 into backside chamber 32 of piston member assembly 34, thereby extending piston 62 outward (to the right in FIGS. 5–11). Fluid flow is consequently established between backside chamber 32 and first feedback passage 72, second solenoid valve assembly 70, and second shuttle valve 78. Due to the pressure difference in second shuttle valve 78, shuttle ball 80 will shift to close fluid passage 84 and to open second feedback passage 86. Accordingly, when control valve system 10 is in the position illustrated in FIG. 6, fluid inlet passage 16, backside chamber 32 of piston member assembly 34, fluid passage 42, first shuttle valve 46, and valve chamber 52 are all at the same fluid pressure, namely equal to the fluid pressure of fluid inlet passage 16.

Figure 7:
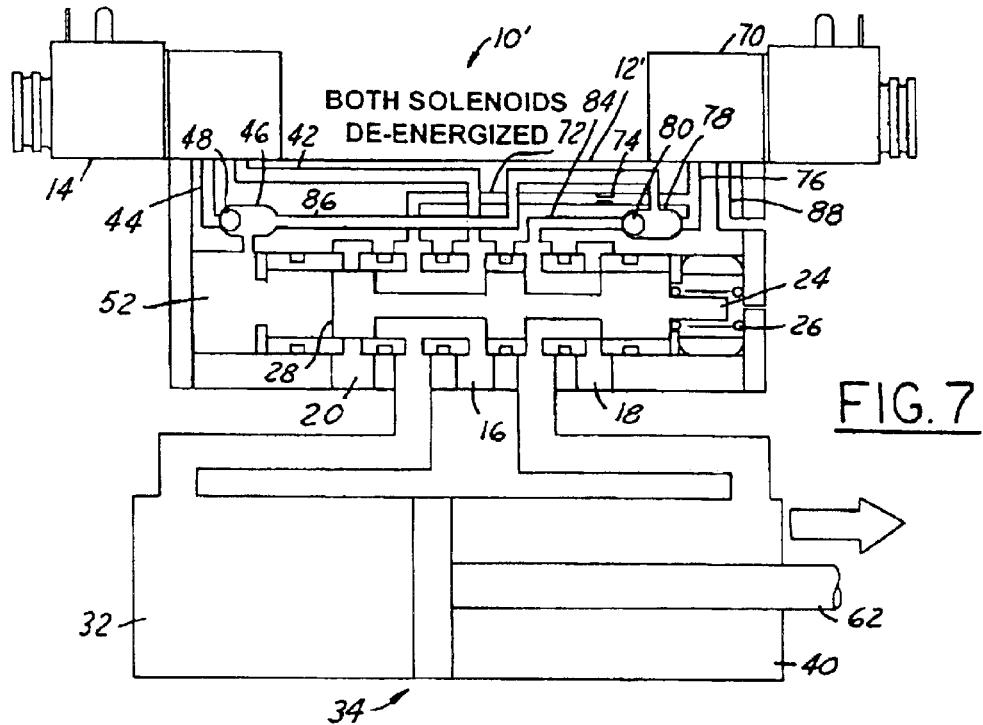
FIG. 7 is a cross-sectional view illustrating the control valve system of FIG. 5 wherein the first and second solenoid valve assemblies are de-energized and the piston continues to extend.

Referring now to FIG. 7, first solenoid valve assembly 14 and second solenoid valve assembly 70 are de-energized and therefore pilot fluid from fluid passage 42 is prevented from entering first shuttle valve 46 and, consequently, valve chamber 52. Therefore, the biasing force of spring 26 acting on shoulder portion 36 of spool 24 biases spool 24 leftward until face portion 28 generally contacts first stop 30. This leftward movement of spool 24 enables fluid communication between fluid inlet passage 16 and front side chamber 40 of piston member assembly 34, thereby retracting piston 62.

Figure 8:
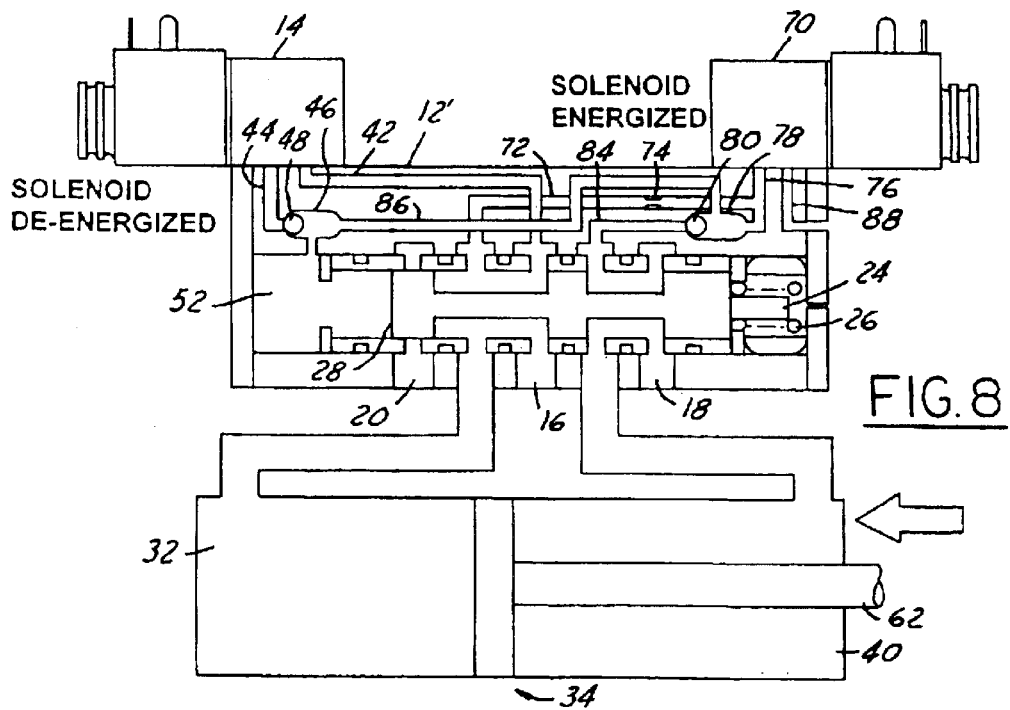
FIG. 8 is a cross-sectional view illustrating the control valve system of FIG. 5 wherein the first solenoid valve assembly is de-energized and the second solenoid valve assembly is energized.
Figure 9:
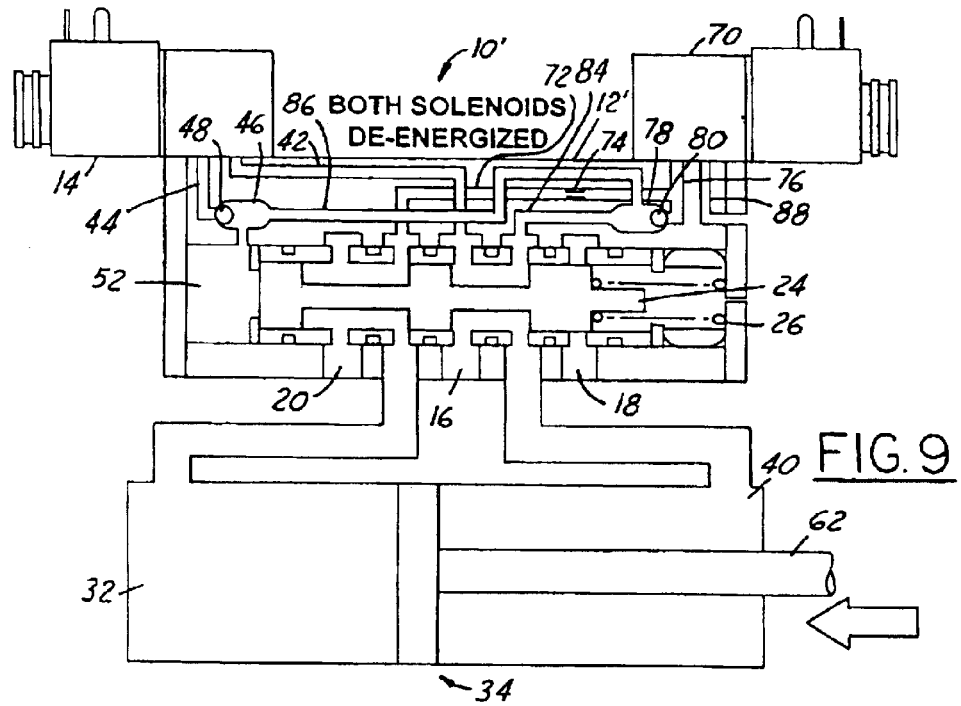
FIG. 9 is a cross-sectional view illustrating the control valve system of FIG. 5 wherein the first and second solenoid valve assemblies are de-energized and the piston continues to retract.

As best seen in FIG. 8, when second solenoid valve assembly 70 is energized such that fluid communication is established between fluid passage 76 and an exhaust passage 88. Consequently, fluid pressure is relieved from valve chamber 52, first shuttle valve 46, second feedback passage 86, second shuttle valve 78, and at least a portion of first feedback passage 72 downstream of restrictor 74. This reduction of fluid pressure in valve chamber 52 causes spool 24 to move to the left under the biasing force of spring 26 as illustrated in FIG. 9. Therefore, fluid flow is established between fluid inlet passage 16 and front side chamber 40 of piston chamber assembly 32 to retract piston 62.

Figure 10:
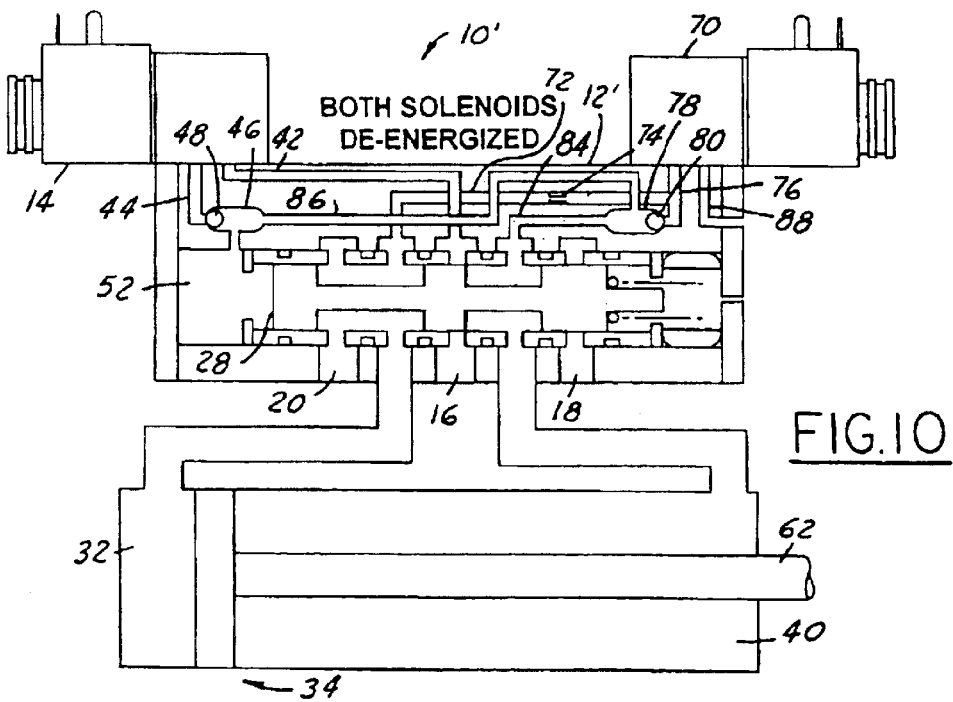
FIG. 10 is a cross-sectional view illustrating the control valve system of FIG. 5 wherein the first and second solenoid valve assemblies are de-energized and the piston is stationary.
Figure 11:
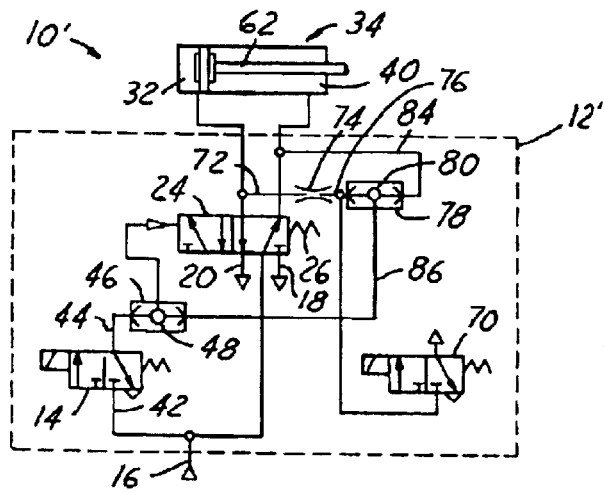
FIG. 11 is a circuit diagram illustrating the control valve system according to the second embodiment of the present invention.

As can be appreciated from FIG. 10, fluid passage 84, second shuttle valve 78, second feedback passage 86, and first shuttle valve 46 establish fluid communication between front side chamber 40 of piston member assembly 34 and valve chamber 52 and, therefore, are at the same fluid pressure in this state. As in the first embodiment, these passages serve to maintain the fluid pressure within front side chamber 40 at a pressure directly proportional to spring 26 and are able to overcome pressure leakage and the like using a pressure less than full line pressure, thereby reducing the amount of energy consumed.

Referring now to FIGS. 15–19, in which like reference numerals designate like or corresponding parts throughout the several views and those views of the previous embodiments, there is illustrated a control valve system 10'' in accordance with a fourth embodiment of the present invention.

Referring in particular to FIGS. 15–17, control valve system 10'' comprises a main valve assembly 12'' and a solenoid valve assembly 14. Main valve assembly 12'' is positioned adjacent to and operably coupled to solenoid valve assembly 14. Main valve assembly 12'' includes a fluid inlet passage 16, a first exhaust passage 18, a second exhaust passage 20, and a valve bore 22''. Disposed within valve bore 22'' is a valve member or spool 24''. Spool 24'' is normally biased via a spring 26 and fluid pressure acting upon an end face 36'' into a far left position to exhaust fluid from a backside chamber 32 (as in FIGS. 1–14) of a piston member assembly 34 out second exhaust passage 20 (FIG. 16). As will be described below, spool 24'' is further positionable in a far-right position to exhaust fluid from a front side chamber 40 of piston member assembly 34 through first exhaust passage 18 (FIG. 15).

Spool 24'' of control valve system 10'' further includes an enlarged face portion 28'' mounted to or formed integrally with spool 24''. Enlarged end face 28'' is disposed within an enlarged valve bore section 200 of valve bore 22''. Enlarged face portion 28'' includes a seal 202 disposed between enlarged face portion 28'' and the sidewalls of enlarged valve bore section 200 to provide a sealing engagement between a first chamber 204 of enlarged valve bore section 200 (FIG. 15) and a second chamber 206 of enlarged valve bore section 200 (FIG. 16). Second chamber 206 is ventable through a vent 207. As can be seen from the figures, enlarged face portion 28'' is larger in diameter than spool 24''. This arrangement enables a lesser amount of pilot pressure from solenoid valve assembly 14 to actuate spool 24'' to overcome the biasing force of spring 26 and the fluid pressure acting against end face 36'' as compared to the above-recited embodiments. However, it should be understood that enlarged face portion 28'' may be of any size that is conducive to the particular application, within the physical limits of control valve system 10''.

Control valve system 10'' further includes a piston 208 moveably disposed within a piston bore 210. Piston 208 includes a seal 212 disposed between piston 208 and piston bore 210 to provide a sealing engagement between a first chamber 214 of piston bore 210 (FIG. 15) and a second chamber 216 of piston bore 210 (FIG. 17). A stem 218 extends orthogonally from piston 208 into enlarged valve bore section 200 through an aperture 219. Stem 218 is sized to selectively engage enlarged face portion 28'' of spool 24'', as will be described below. Piston 208 is preferably larger in diameter than spool 24''. Aperture 219 may be sized to permit first chamber 214 and first chamber 204 to be in fluid communication with each other.

Control valve system 10'' still further includes a plurality of fluid passages operably interconnecting fluid inlet passage 16, first exhaust passage 18, second exhaust passage 20, spool 24'', and piston 208. A fluid passage 42'' extends between fluid inlet passage 16 and an inlet to solenoid valve assembly 14. Fluid passage 42'' serves as a pilot passage to supply a pilot pressure to solenoid valve assembly 14. Fluid passage 42'' further extends in an opposite direction to a fluid chamber 220 defined by spool 24'', end face 36'' of valve bore 22'', and an end cap 222. A fluid passage 44'' extends between an outlet of solenoid valve assembly 14 and first chamber 204 of enlarged valve bore section 200.

Control valve system 10'' further includes a feedback passage 224 extending between front side chamber 40 and second chamber 216 of piston bore 210. Accordingly, feedback passage 224 serves to provide fluid pressure from front side chamber 40 to act against piston 208 to drive piston 208 to the right. As can be seen from FIGS. 15–19, feedback passage 224 extends through an end cap 226. The significance of this arrangement will be discussed below.

FIG. 15 illustrates control valve system 10'' in a normal operation mode in which pressurized fluid from fluid inlet passage 16 is directed into backside chamber 32 of piston member assembly 34 to drive a piston 62 outward (to the right in the figures). Specifically, pressurized fluid from fluid inlet passage 16 is provided in fluid passage 42''. As seen in FIG. 15, solenoid valve assembly 14 is energized such that fluid communication is established between fluid passage 42'' and fluid passage 44''. Pressurized fluid is then introduced from fluid passage 44'' into first chamber 204 of enlarged valve bore section 200. The fluid pressure within first chamber 204 of enlarged valve bore section 200 acts upon enlarged face portion 28'' of spool 24''. Simultaneously, pressurized fluid is introduced from fluid passage 42'' into fluid chamber 220 and acts upon end face 36'' of spool 24''. Once the force exerted upon enlarged face portion 28'' from the fluid pressure within first chamber 204 of enlarged valve bore section 200 is greater than the sum of the biasing force of spring 26 and the force exerted upon end face 36'' of spool 24'', spool 24'' moves to the right until enlarged face portion 28'' engages a shoulder portion 228. This movement of spool 24'' enables fluid to flow from fluid inlet passage 16 into backside chamber 32 of piston member assembly 34, thereby extending piston 62 outward (to the right in FIGS. 1–4). Accordingly, when control valve system 10'' is in the position illustrated in FIG. 15, fluid inlet passage 16, backside chamber 32 of piston member assembly 34, fluid passage 42'', fluid chamber 220, and first chamber 204 of enlarged valve bore section 200 are all at the same fluid pressure, namely equal to the fluid pressure of fluid inlet passage 16.

Referring now to FIG. 16, solenoid valve assembly 14 is de-energized and therefore pilot fluid from fluid passage 42'' is prevented from entering first chamber 204 of enlarged valve bore section 200. Hence, first chamber 204, second chamber 206, and first chamber 214 are vented to atmosphere. Thus, the sum of the biasing force of spring 26 and the force of fluid pressure in chamber 220 acting upon end face 36'' of spool 24'' biases spool 24'' leftward until enlarged face portion 28" generally contacts stem 218. This leftward movement of spool 24" enables fluid communication between fluid inlet passage 16 and front side chamber 40 of piston member assembly 34, thereby retracting piston 62.

As can be appreciated from FIG. 16, feedback passage 224 is in fluid communication with front side chamber 40 of piston member assembly 34 and, therefore, is at the same fluid pressure as fluid inlet passage 16. The introduction of pressurized fluid from fluid inlet passage 16 into front side chamber 40 and feedback passage 224 enters second chamber 216 of piston bore 210 and forces piston 208 rightward. Due to the physical contact between stem 218 and enlarged face portion 28" of spool 24", any rightward movement of piston 208 causes a corresponding rightward movement of spool 24".

The pressure at which this rightward movement of spool 24" occurs is dependent upon the relative surface areas of piston 208 and end face 36" of spool 24" in addition to the biasing force of spring 26. In other words, spool 24" will move rightward once the fluid force exerted on piston 208 is greater than the sum of the fluid force, the biasing force, and any frictional force exerted on the right side. Therefore, in order to determine the applicable forces, it is necessary to consider the 1) fluid pressure and the 2) surface area the fluid pressure acts upon. As seen in FIG. 16, the fluid pressure acting upon piston 208 and spool 24" is equal to each other (namely, equal to the fluid pressure of fluid inlet passage 16). Therefore, because the surface area of piston 208 is greater than the surface area of end face 36" of spool 24", a greater force is produced on the left side of spool 24" that overcome the biasing force of spring 26 causing spool 24" to move rightward.

As seen in FIG. 17, spool 24" will continue to move rightward until spool 24" blocks fluid inlet passage 16, at which time spool 24" reaches an equilibrium position. This equilibrium position is characterized in that a predetermined fluid pressure less than the inlet pressure of fluid inlet passage 16 but greater than atmosphere exists in front side chamber 40 and, due to feedback passage 224, second chamber 216 of piston bore 210. This force exerted on piston 208 is in equilibrium with the sum of the force exerted on end face 36" and the force of spring 26. However, it should be appreciated by one skilled in the art that any fluid leaks or other anomalies, which decreases this balance, will cause a simultaneous decrease in fluid pressure within second chamber 216 of piston bore 210. This decrease in fluid pressure in second chamber 216 of piston bore 210 enables the pressure acting on end face 36" of spool 24" and the biasing force of spring 26 to move spool 24" leftward, thereby again opening fluid communication between fluid inlet passage 16 and front side chamber 40 of piston member assembly 34 until an equilibrium is once again achieved. Therefore, it should be clear that this arrangement serves to provide a low energy consuming method of automatically maintaining a predetermined fluid pressure in front side chamber 40 of piston member assembly 34 simply by choosing the appropriate relative areas of piston 208 and end face 36" and choosing the appropriate biasing force in spring 26, thereby eliminating the need for a shuttle valve 46.

Referring now to FIGS. 18 and 19, it can be seen that the present embodiment provides the opportunity to bypass piston 208 completely, thereby providing a control valve capable of operating in a non-energy saving mode. As is well known to those skilled in the art, it is sometimes preferred to use an energy saving control valve in one application while using a non-energy saving control valve in another application. Because the cost to stock both versions of replacement control valves can be enormous, control valve system 10" provides the opportunity to use one control valve in either application—energy saving mode or non-energy saving mode. To achieve this result, control valve system 10" is equipped with removable end cap 226. Feedback passage 224 extends through end cap 226. Accordingly, if an energy saving mode is needed, end cap 226 is positioned as is shown in FIGS. 15–17 (where fluid communication is maintained between front side chamber 40 and second chamber 216 of piston bore 210). However, on the other hand, if a non-energy saving mode is needed, end cap 226 is reversed as is shown in FIGS. 18–19 (wherein fluid communication is interrupted between front side chamber 40 and second chamber 216 of piston bore 210). In this position, control valve system 10" can operate similar to a standard two-position, four-way control valve.

Moreover, it should be appreciated that the pressure regulation feature of the present invention is accomplished without the need to provide full line pressure, which would otherwise consume an excessive amount of electrical energy. That is, by way of non-limiting example, traditional double action cylinders often operate such that their return to their initial position is only accomplished through the use of full-line pressure. This use of full-line pressure in the return stroke consumes an equivalent amount of compressed air as that consumed during a power stroke. This consumption of compressed air during the return stroke is believed to be unnecessary. According to the principles of the present invention, the low pressure in one outlet is sufficient for a rapid return stroke, which reduces the amount of compressed air that is consumed, thereby reducing the energy consumed by the work element. Additionally, due to the low pressure that is applied, the potential for leaks in the cylinder and/or fittings is also reduced. These advantages are obtained through the operation of the spool as a pressure regulator.

Figure 21:
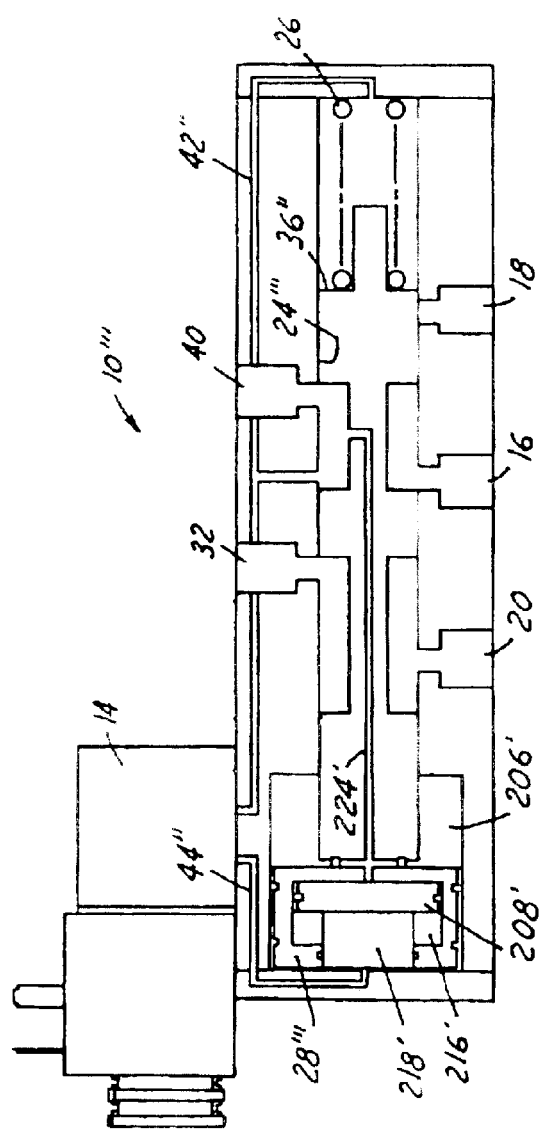
FIG. 21 is a cross-sectional view illustrating the control valve system of FIG. 20 wherein the solenoid valve assembly is de-energized.
Figure 22:
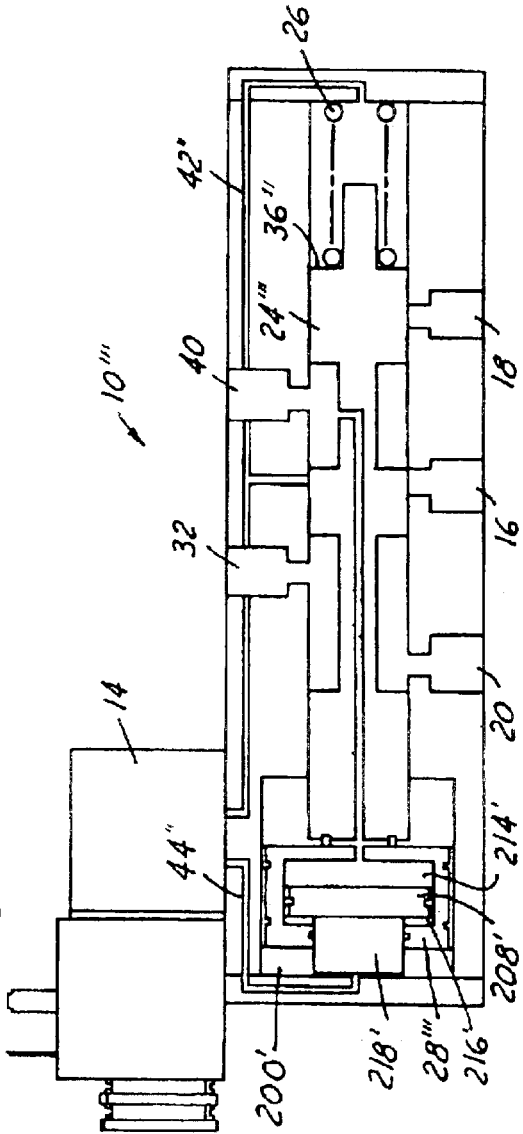
FIG. 22 is a cross-sectional view illustrating the control valve system of FIG. 20 being maintained in a predetermined position while the solenoid valve assembly remains de-energized and the valve spool is in an equilibrium position.

With reference to FIGS. 20–22, a variation of the above principles described in connection with the fourth embodiment is illustrated. In this regard, a control valve system 10''' is illustrated having a spool 24''' with an enlarged face portion 28''' mounted to or formed integrally with spool 24'''. Enlarged end face 28''' is disposed within an enlarged valve bore section 200' of valve bore 22'''. Enlarged face portion 28''' includes a pair of seals 202' disposed between enlarged face portion 28''' and the sidewalls of enlarged valve bore section 200' to provide a sealing engagement between a first chamber 204' of enlarged valve bore section 200' (FIG. 20) and a second chamber 206' of enlarged valve bore section 200' (FIG. 21). As can be seen from the figures, enlarged face portion 28''' is larger in diameter than spool 24'''. This arrangement enables a lesser amount of pilot pressure from solenoid valve assembly 14 to actuate spool 24''' to overcome the biasing force of spring 26' and the fluid pressure acting against end face 36" as compared to the above recited embodiments. However, it should be understood that enlarged face portion 28''' may be of any size that is conducive to the particular application, within the physical limits of control valve system 10'''.

A piston 208' moveably disposed within a piston bore 210' formed within an enlarged face portion 28'''. Piston 208' includes a seal 212' disposed between piston 208' and enlarged face portion 28''' to provide a sealing engagement between a first chamber 214' of piston bore 210' (FIG. 20) and a second chamber 216' of piston bore 210' (FIG. 22). A stem 218' extends orthogonally from piston 208' into enlarged valve bore section 200' through an aperture 219'.

Stem 218' is sized to selectively engage end cap 226', as will be described below. Piston 208' is preferably larger in diameter than a spool 24'".

Control valve system 10'" further includes a feedback passage 224' extending through spool 24'" between front side chamber 40 and first chamber 214' of piston bore 210'. Accordingly, feedback passage 224' serves to provide fluid pressure from front side chamber 40 to act against piston 208' to drive piston 208' to the left.

FIG. 20 illustrates control valve system 10'" in a normal operation mode in which pressurized fluid from fluid inlet passage 16 is directed into backside chamber 32 of piston member assembly 34 to drive a piston 62 outward (to the right in the figures). Specifically, pressurized fluid from fluid inlet passage 16 is provided in fluid passage 42". As seen in FIG. 20, solenoid valve assembly 14 is energized such that fluid communication is established between fluid passage 42" and fluid passage 44". Pressurized fluid is then introduced from fluid passage 44" into first chamber 204' of enlarged valve bore section 200'. The fluid pressure within first chamber 204' of enlarged valve bore section 200' acts upon enlarged face portion 28'" of spool 24'" and a portion of stem 218' of piston 208'. Simultaneously, pressurized fluid is introduced from fluid passage 42" into fluid chamber 220 and acts upon end face 36" of spool 24'". Once the force exerted upon enlarged face portion 28'" and stem 218' of piston 208' from the fluid pressure within first chamber 204' of enlarged valve bore section 200' is greater than the sum of the biasing force of spring 26 and the force exerted upon end face 36" of spool 24'", spool 24'" moves to the right until enlarged face portion 28'" engages a shoulder portion 228'. This movement of spool 24'" enables fluid to flow from fluid inlet passage 16 into backside chamber 32 of piston member assembly 34, thereby extending piston 62 outward (to the right in FIGS. 1–4). Accordingly, when control valve system 10'" is in the position illustrated in FIG. 20, fluid inlet passage 16, backside chamber 32 of piston member assembly 34, fluid passage 42", fluid chamber 220, and first chamber 204' of enlarged valve bore section 200' are all at the same fluid pressure, namely equal to the fluid pressure of fluid inlet passage 16.

Referring now to FIG. 21, solenoid valve assembly 14 is de-energized and therefore pilot fluid from fluid passage 42" is prevented from entering first chamber 204' of enlarged valve bore section 200'. The sum of the biasing force of spring 26 and the force of fluid pressure in chamber 220 acting upon end face 36" of spool 24'" biases spool 24'" leftward until enlarged face portion 28'" and stem 218' generally contact end cap 226'. This leftward movement of spool 24'" enables fluid communication between fluid inlet passage 16 and front side chamber 40 of piston member assembly 34, thereby retracting piston 62.

As can be appreciated from FIGS. 20–22, feedback passage 224' is in fluid communication with front side chamber 40 of piston member assembly 34 and, therefore, is at the same fluid pressure as fluid inlet passage 16. The introduction of pressurized fluid from fluid inlet passage 16 into front side chamber 40 and feedback passage 224' enters first chamber 214' of piston bore 210' and forces piston 208' leftward. Due to the physical contact between stem 218' and end cap 226', any leftward movement of piston 208' causes a corresponding rightward movement of spool 24'". The pressure at which this rightward movement of spool 24" occurs is dependent upon the relative surface areas of piston 208' and end face 36" of spool 24'" in addition to the biasing force of spring 26, as described above. As seen in FIG. 22, spool 24'" will continue to move rightward until spool 24'" blocks fluid inlet passage 16, at which time spool 24'" reaches an equilibrium position as described above.

It should be understood that the present variation enables efficiencies to be realized in the construction of the control valve system, namely the ease of construction. That is, the construction of the feedback passage within the spool is simpler than such construction in the housing. However, the present variation may not afford the range in flexibility in choosing the appropriate size of surface areas as compared to the fourth embodiment (FIGS. 15–19).

With reference to FIGS. 23–28, a variation of the above principles is described in connection with a fifth embodiment. In this regard, a control valve system 10"" is illustrated having a primary spool 15 and a secondary spool 17 slidably retained in valve chamber 19. Primary spool 15 is shaped to provide controlled fluid communication between inlet port 16, exhaust ports 18 and 20, a first output port 40 and a second output port 32 depending upon the axial position of primary spool 15. Primary spool 15 includes a first end 21 having a retention feature for retaining biaser spring 26. A second end 23 of primary spool 15 abuts a first end 25 of secondary spool 17. An enlarged chamber 29 receives a second end 27 of secondary spool 17. A circumferential seal 31 around second end 27 engages the wall of chamber 29 so that the area within chamber 29 defined by second end 27 is sealed off from a pressure relief passage 33. Second end 27 of secondary spool 17 presents a working surface having an area greater than either the working surface areas of ends 21 or 23 of primary spool 15 (which are preferably equal to each other).

Figure 23:
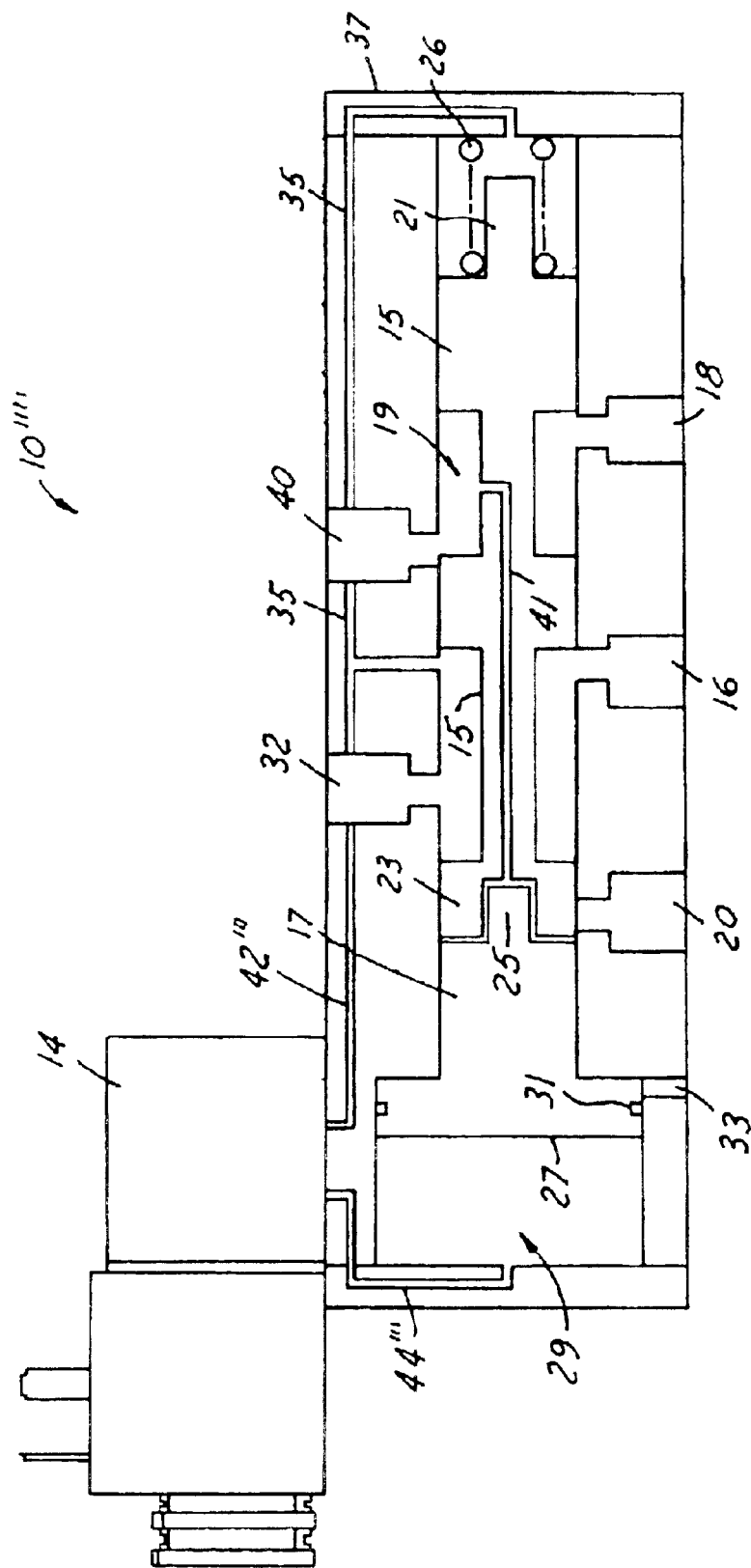
FIG. 23 is a cross-sectional view of a control valve system of a fifth embodiment, wherein the valve is configured in a standard mode and the solenoid valve system is energized.
Figure 24:
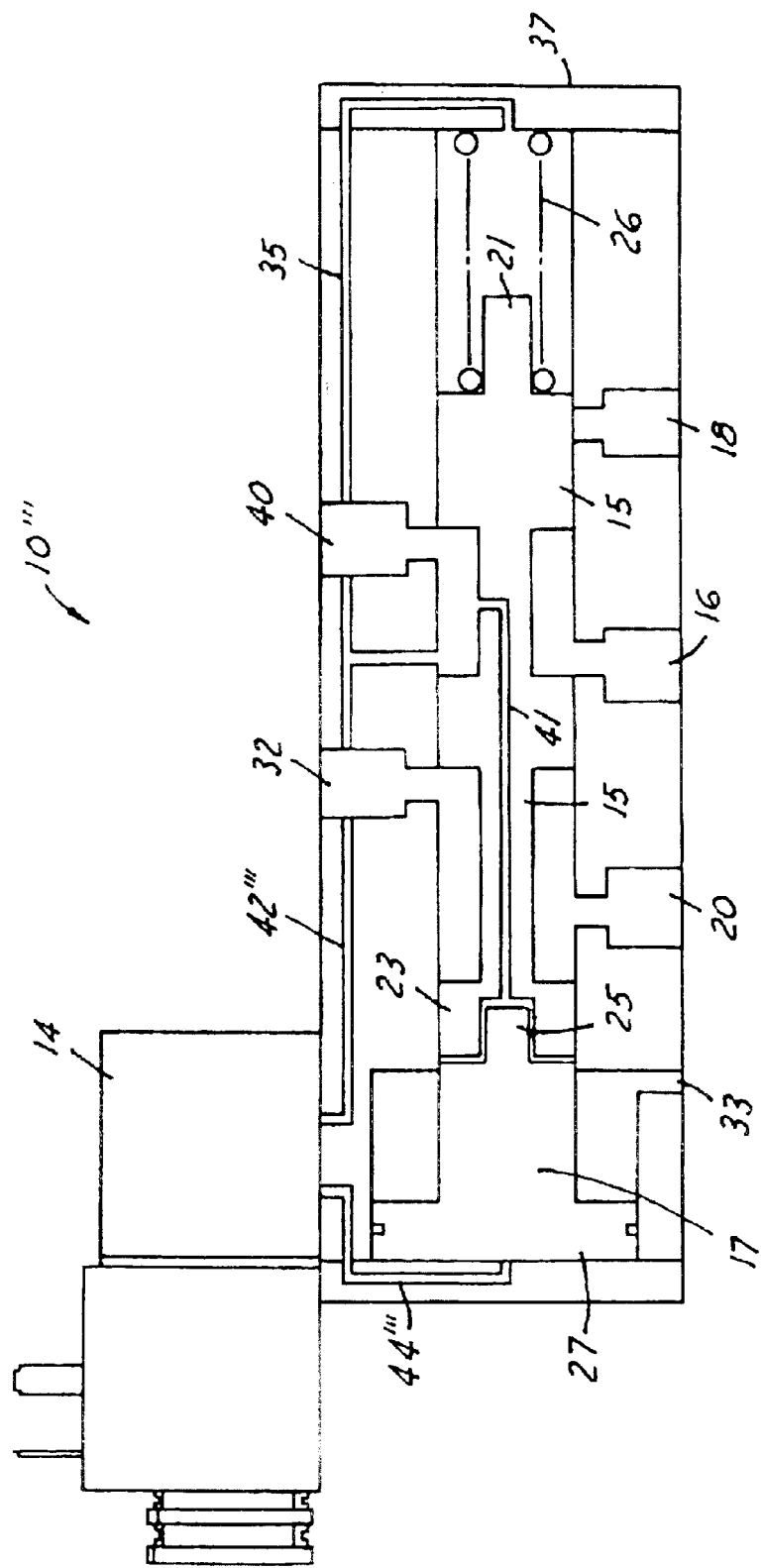
FIG. 24 is a cross-sectional view illustrating the control valve system of FIG. 23 wherein the solenoid valve assembly is de-energized.
Figure 25:
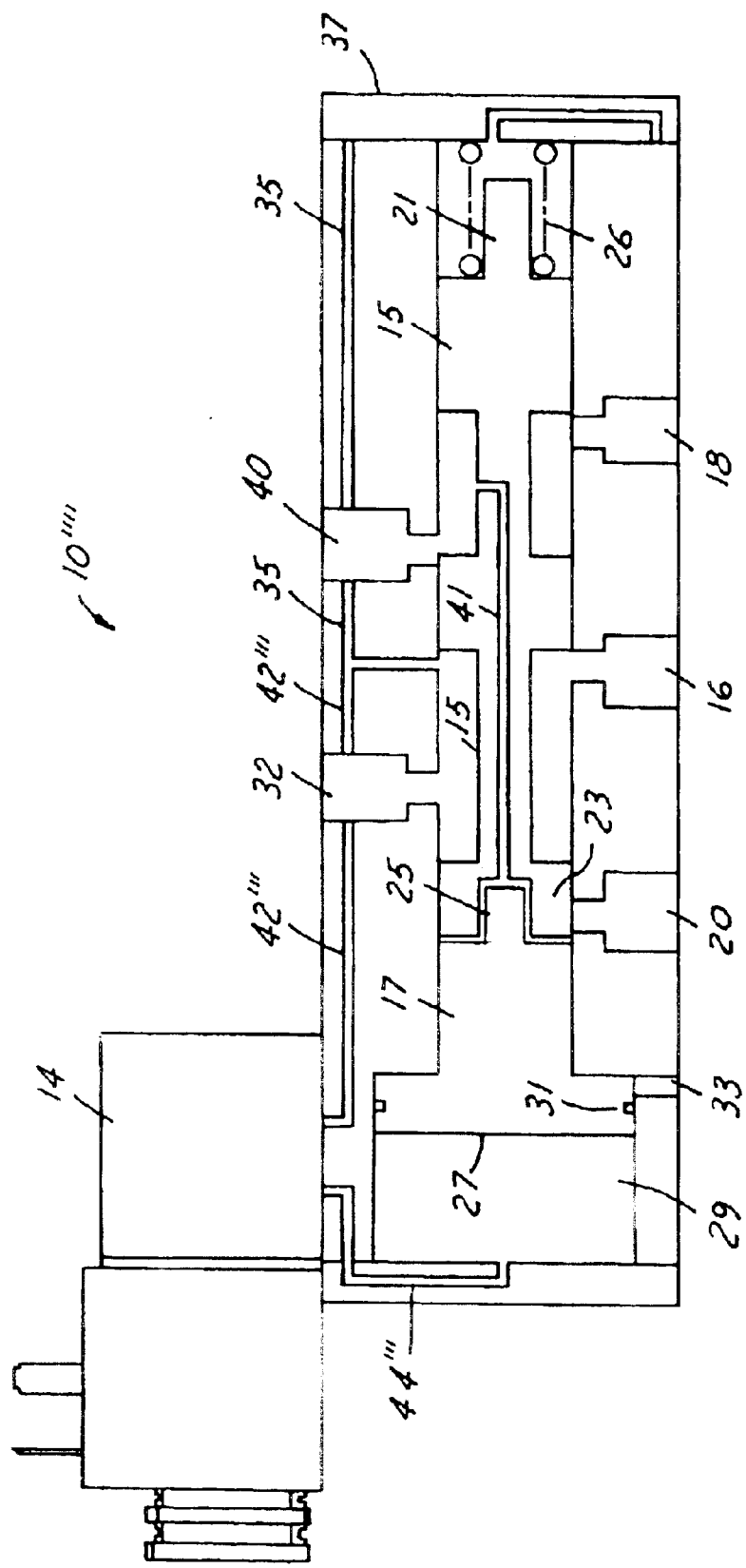
FIG. 25 is a cross-sectional view illustrating the control valve system of FIG. 23 wherein the valve is configured in an energy saver mode and the solenoid valve assembly is energized.
Figure 26:
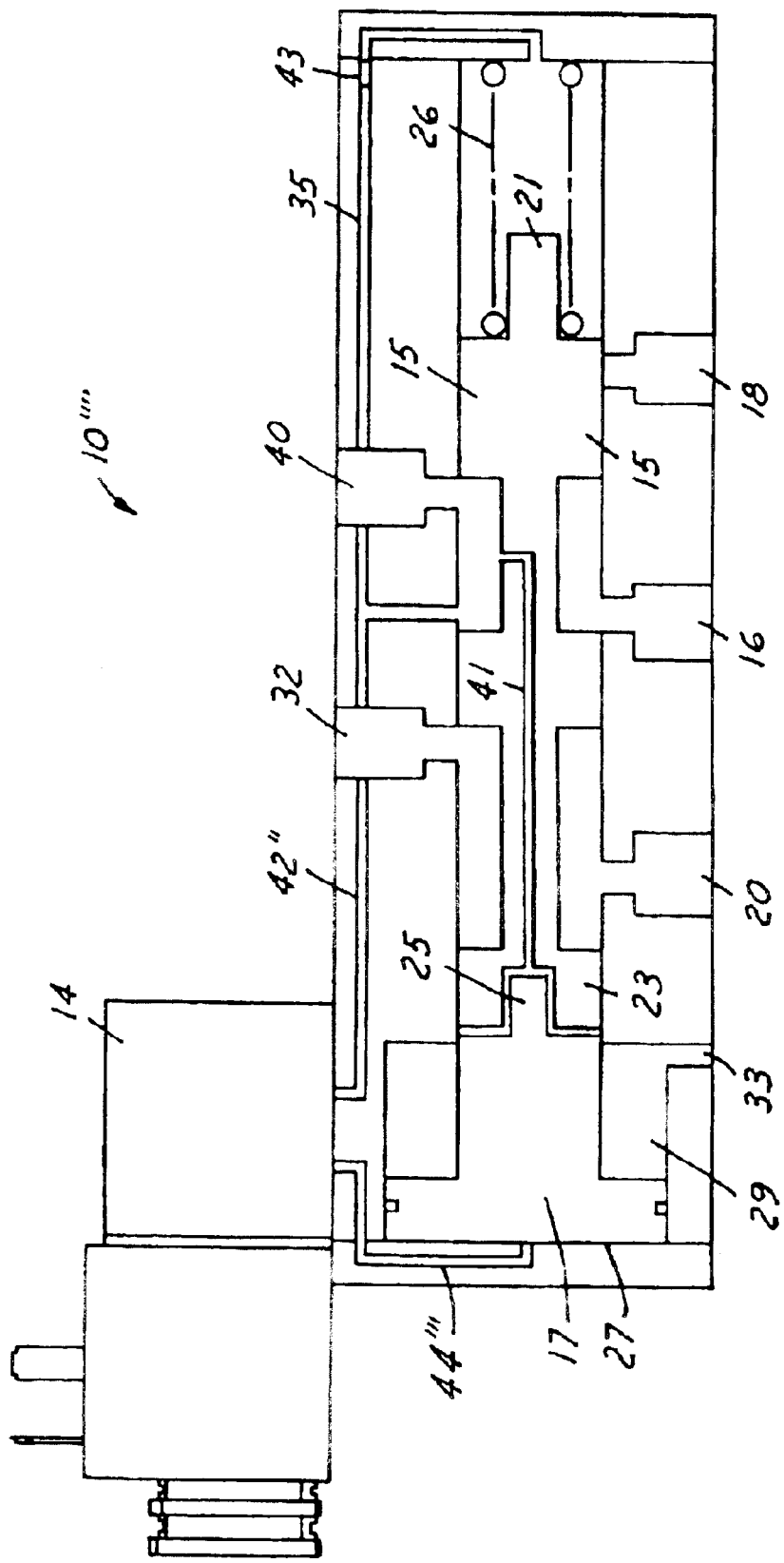
FIG. 26 is a cross-sectional view illustrating the control valve system of FIG. 25 wherein the solenoid valve assembly is de-energized.
Figure 27:
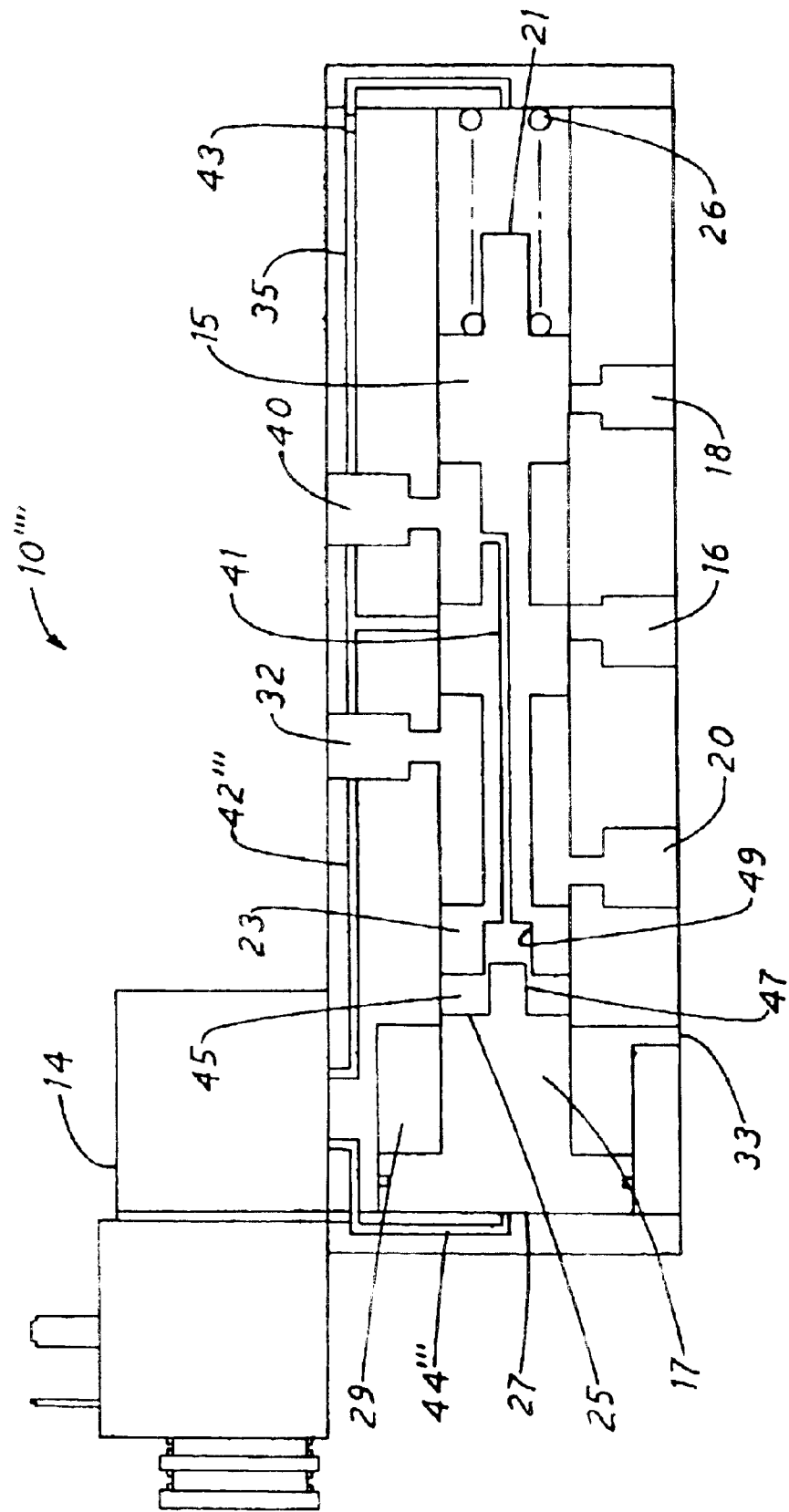
FIG. 27 is a cross-sectional view illustrating the control valve system of FIG. 25 wherein the solenoid valve assembly is de-energized and the pressure to the first output port is being regulated in the energy saver mode.
Figure 28:
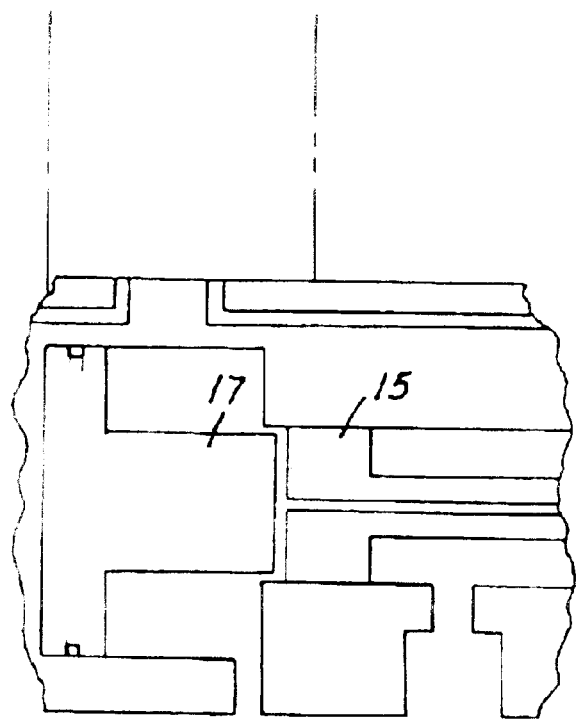
FIG. 28 is a cross-sectional view of the control valve system of FIGS. 23–27 including flat surfaces between the primary and secondary spools.
Figure 29:
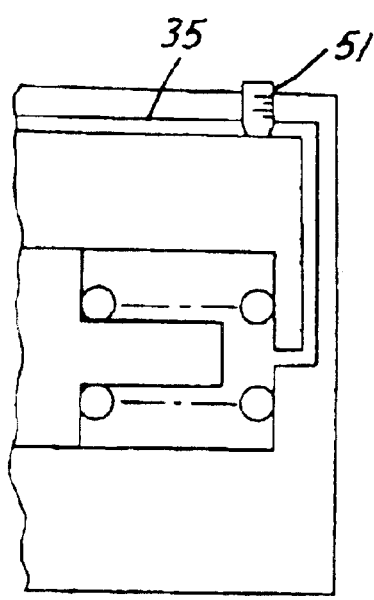
FIG. 29 is a cross-sectional view illustrating a screw for selectably obstructing the passage for placing the control valve system into either the standard mode or the energy saver mode.

The control valve system of FIGS. 23–28 is operable in either a standard mode or an energy saver mode as determined by a selectable fluid connection between inlet port 16 and first end 21 of primary spool 15. A fluid passage 35 is included in the valve housing to provide the selectable connection. A portion of passage 35 is constructed within an end cap 37 which may be installed in either of two positions, one that completes the connection between inlet port 16 and first end 21 of primary spool 15 (as shown in FIGS. 23 and 24) and one that blocks the connection (as shown in FIG. 25). Alternatively, passage 35 may include a movable obstruction as shown in FIGS. 26, 27, and 29.

FIGS. 23 and 24 show the standard mode of operating the control valve system wherein primary spool 15 and secondary spool 17 move in unison between a first position shown in FIG. 24 and a second position shown in FIG. 23. In the first position, solenoid 14 is deactivated so that no pilot pressure is applied to second end 27 of secondary spool 17 and the spring force of biaser 26 urges spools 15 and 17 toward the left in FIG. 24, thereby providing full line pressure to first output port 40 and coupling second output port 32 to exhaust port 20. When solenoid 14 is activated and pilot pressure is applied to second end 27 of secondary spool 17, the greater working surface area of second end 27 overcomes the spring biasing force and the pressure working against first end 21 of primary spool 15 so that spools 15 and 17 move into the second position (i.e., toward the right in FIG. 23), thereby providing full line pressure to second output port 32 and coupling first output port 40 to exhaust port 18.

A fluid passage 41 couples first output port 40 to the space between second end 23 of primary spool 17 and first end 25 of secondary spool 17. When operating in the standard mode (i.e., with first end 21 of primary spool 15 always at full line pressure), sufficient force to separate spools 15 and 17 cannot be generated. Consequently, the spools move in unison.

FIGS. 25–27 show operation of the control valve system in the energy saver mode wherein passage 35 is blocked off from the first end of primary spool 15. Thus, end cap 37 is shown installed in a reversed position in FIG. 25 so that fluid communication is disrupted. Alternatively, FIGS. 26 and 27 show a controllable obstruction that may be used to block passage 35.

In FIG. 25, solenoid valve assembly 14 is energized so that pilot fluid from fluid passage 42''' enters chamber 29 via fluid passage 44'''. The pressure working against second end 27 moves spools 15 and 17 into the second position (now only the force of bias spring 26 needs to be overcome). Full line pressure from inlet port 16 is coupled to second output port 32 and first output port 40 is coupled to exhaust port 18.

FIG. 26 shows the initial position of spools 15 and 17 in the energy saver mode when solenoid valve system 14 is de-energized, thereby removing pressure from second end 27 of secondary spool 17. The unopposed force from bias spring 26 moves spools 15 and 17 into the first (i.e., leftmost) position in FIG. 26, resulting in full line pressure being applied to first output port 40.

As fluid flows into first output port 40 and to the piston member attached to it, the pressure builds up to full line pressure. The building pressure is applied to second end 23 of primary spool 15 through passage 41. Since secondary spool 17 already abuts the end of enlarged chamber 29, the building pressure between spools 15 and 17 tends to urge primary spool 15 to the right against the force of bias spring 26 which opens up a space 45 between the spools. When a sufficient pressure is reached, primary spool 15 enters a third position as shown in FIG. 27 wherein inlet port 16 is blocked from both output ports. The pressure at which inlet port 16 is blocked off depend upon the magnitude of the bias force of spring 26 and the geometry of the spools, chambers, and ports. The valve works as a pressure regulator at this predetermined pressure. The present embodiment has the advantageous ability to regulate at lower pressures that conventional regulators (e.g., at a predetermined pressure of about 2 bars).

In order to maintain alignment between spools 15 and 17, a central post 47 may be provided on first end 25 of secondary spool 17 for mating with a coaxial socket 49 is second end 23 of primary spool 15. In an alternative embodiment shown in FIG. 28, the abutting ends of spools 15 and 17 comprises flat mating surfaces.

FIG. 29 shows an alternative embodiment wherein a movable obstruction for selectively blocking passage 35 is comprised of a screw 51. Screw 51 may be extended into or withdrawn from passage 35 by rotating the screw within a threaded bore intersecting passage 35.

It should be noted that in the same way that the embodiment of FIGS. 1–4 can be modified to include a double solenoid pilot as shown in FIGS. 5–11, the embodiments of FIGS. 15–27 can also be implemented with a double solenoid pilot.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A control valve system comprising:
   a housing having an inlet port, a first output port, a second output port, and a valve chamber;
   a primary spool having first and second longitudinal ends with respective working surface areas being substantially equal, wherein said primary spool is slidable in said valve chamber to a first position where fluid communication is established between said inlet port and said first output port, a second position where fluid communication is established between said inlet port and said second output port, and an intermediate third position where fluid communication is generally prevented between said inlet port and both of said first and second output ports;
   a secondary spool independently slidable in said valve chamber, said secondary spool having a first end for abutting against said second end of said primary spool and having a second end with a working surface area greater than either of said working surface areas of said primary spool;
   a solenoid valve assembly coupled in fluid communication with said inlet port, wherein said solenoid valve assembly is positionable in a first position for providing fluid communication from said inlet port to said second end of said secondary spool to move said primary spool from said first position to said second position, and wherein said solenoid valve assembly is positionable in a second position to isolate said inlet port from said second end of said secondary spool;
   a biaser providing a biasing force to said primary spool in a direction toward said first position, said biasing force having a predetermined magnitude when said primary spool is in said third position; and
   a first fluid passage through said primary spool providing fluid communication between said first output port and said second end of said primary spool for displacing said primary spool relative to said secondary spool in an energy saving mode when said solenoid valve is in said second position, thereby regulating a pressure at said first output relative to said predetermined magnitude of said biasing force.

2. The control valve system of claim 1 further comprising a second fluid passage having an open condition and a closed condition for selectably providing fluid communication between said inlet port and said first end of said primary spool, wherein said control valve system operates in a standard mode with said primary and secondary spools moving in unison when said second fluid passage is in said open condition, and where said control valve system operates in said energy saving mode when said second fluid passage is in said closed condition.

3. The control valve system of claim 2 further comprising an end cap enclosing said valve chamber proximate said first end of said primary spool, wherein said end cap includes a third passage therein, and wherein said end cap is selectably attachable with a first orientation wherein said third passage couples said second passage with said valve chamber and with a second orientation wherein said second passage is blocked from said valve chamber.

4. The control valve system of claim 2 further comprising a movable obstruction for selectably blocking said second fluid passage to create said open and closed conditions.

5. The control valve system of claim 4 wherein said movable obstruction is comprised of a screw.

6. The control valve system of claim 1 wherein said valve chamber comprises a main chamber receiving said primary spool and having a first cross-sectional area corresponding to said working surface areas of said first and second ends of said primary spool, and wherein said valve chamber further comprises a secondary chamber receiving at least a portion of said secondary spool and having a second cross-sectional area corresponding to said working surface area of said working surface area of said second end of said secondary spool.

7. The control valve system of claim 6 further comprising a relief passage coupled to said secondary chamber for relieving pressure in said secondary chamber when said solenoid valve is in said second position.

8. The control valve of claim 1 wherein said second end of said primary spool and said first end of said secondary spool include complementary alignment features for intermeshing when said primary spool and said secondary spool are abutting.

9. A method of operating a control valve system wherein said valve system includes a housing having an inlet port, a first output port, a second output port, and a valve chamber, wherein said valve system includes a primary spool having first and second longitudinal ends with respective working surface areas being substantially equal and a secondary spool independently slidable in said valve chamber and having a first end for abutting against said second end of said primary spool and having a second end with a working surface area greater than either of said working surface areas of said primary spool, wherein said valve system includes a solenoid valve assembly coupled in fluid communication with said inlet port, wherein said valve system includes a biaser providing a biasing force to said primary spool having a predetermined magnitude, wherein said valve system includes a first fluid passage through said primary spool providing fluid communication between said first output port and said second end of said primary spool, said method comprising the steps of:

selecting either a standard mode or an energy saver mode of said valve system by selectably connecting said inlet port to said first end of said primary spool, wherein said standard mode is comprised of said primary spool and said secondary spool moving in unison within said valve chamber when said inlet port is in fluid communication with said first end of said primary spool, and wherein said energy saver mode is comprised of said primary spool and said secondary spool moving independently within said valve chamber when said inlet port is not in fluid communication with said first end of said primary spool;

energizing said solenoid to couple said inlet port to said second end of said secondary spool, thereby providing fluid communication from said inlet port to said second output port in both said standard mode and said energy saver mode; and de-energizing said solenoid to isolate said inlet port from said second end of said secondary spool and from said second output port;

whereby when said solenoid is de-energized and said standard mode is selected, then fluid communication is continuously maintained between said inlet port and said first output port; and whereby when said solenoid is de-energized and said energy save mode is selected, then fluid communication is between said inlet port and said first output port is modulated to maintain a predetermined pressure at said first output port, said modulating of said fluid communication resulting from moving said primary spool in said valve chamber independently relative to said secondary spool.

10. The method of claim 9 wherein said step of selecting said standard mode or said energy saver mode is comprised of positioning an end cap on said housing in a first orientation or a second orientation, wherein said end cap includes a passage for completing fluid communication between said inlet port and said first end of said primary spool when in said first orientation, and wherein said end cap includes a solid body for blocking fluid communication between said inlet port and said first end of said primary spool when in said second orientation.

11. The method of claim 9 wherein said step of selecting said standard mode or said energy saver mode is comprised of positioning a movable obstruction relative to a blockable passage between said inlet port and said first end of said primary spool.

12. The method of claim 11 wherein said movable obstruction is a screw selectably movable into and out of said blockable passage by rotation of said screw.

* * * * *